United States Patent
Vaziri et al.

(10) Patent No.: US 9,952,422 B2
(45) Date of Patent: Apr. 24, 2018

(54) ENHANCING THE RESOLUTION OF THREE DIMENSIONAL VIDEO IMAGES FORMED USING A LIGHT FIELD MICROSCOPE

(71) Applicant: University of Vienna, Vienna (AT)

(72) Inventors: Alipasha Vaziri, Vienna (AT); Tobias Nöbauer, Vienna (AT)

(73) Assignee: UNIVERSITY OF VIENNA, Vienna (AT)

( * ) Notice: Subject to any disclaimer, the term of this patent is extended or adjusted under 35 U.S.C. 154(b) by 280 days.

(21) Appl. No.: 14/996,015

(22) Filed: Jan. 14, 2016

(65) Prior Publication Data
US 2017/0205615 A1 Jul. 20, 2017

(51) Int. Cl.
| | |
|---|---|
| *G02B 21/36* | (2006.01) |
| *G02B 21/00* | (2006.01) |
| *G06T 15/08* | (2011.01) |
| *G06T 15/50* | (2011.01) |
| *H04N 13/02* | (2006.01) |
| *H04N 13/00* | (2006.01) |
| *G06T 7/557* | (2017.01) |

(52) U.S. Cl.
CPC ......... *G02B 21/365* (2013.01); *G02B 21/008* (2013.01); *G02B 21/0072* (2013.01); *G02B 21/0076* (2013.01); *G02B 21/367* (2013.01); *G06T 7/557* (2017.01); *H04N 13/0055* (2013.01); *H04N 13/0228* (2013.01); *G06T 2207/10052* (2013.01)

(58) Field of Classification Search
CPC ......... G02B 21/365; G02B 21/0072; G02B 21/008; H04N 13/0228; H04N 13/0055; G06T 15/08; G06T 15/506
See application file for complete search history.

(56) References Cited

U.S. PATENT DOCUMENTS

| | | | | |
|---|---|---|---|---|
| 9,025,894 B2* | 5/2015 | Venkataraman | .......... | G06T 9/00 382/233 |
| 2009/0237501 A1* | 9/2009 | Lemmer | ............ | G01N 21/6428 348/79 |
| 2011/0174986 A1* | 7/2011 | Kempe | ............... | G01N 21/6428 250/458.1 |

(Continued)

OTHER PUBLICATIONS

Mukamel, E.A. et al., "Automated Analysis of Cellular Signals from Large-Scale Calcium Imaging Data", Neuron, 63, 747-760, Sep. 24, 2009, 747-760.

(Continued)

*Primary Examiner* — Neil Mikeska
(74) *Attorney, Agent, or Firm* — NovoTechIP International PLLC

(57) ABSTRACT

Methods and systems are provided for enhancing the imaging resolution of three dimensional imaging using light field microscopy. A first approach enhances the imaging resolution by modeling the scattering of light that occurs in an imaging target, and using the model to account for the effects of light scattering when de-convolving the light field information to retrieve the 3-dimensional (3D) volumetric information of the imaging target. A second approach enhances the imaging resolution by using a second imaging modality such as two-photon, multi-photon, or confocal excitation microscopy to determine the locations of individual neurons, and using the known neuron locations to enhance the extraction of time series signals from the light field microscopy data.

20 Claims, 14 Drawing Sheets

(56) References Cited

U.S. PATENT DOCUMENTS

| | | | |
|---|---|---|---|
| 2013/0176622 A1* | 7/2013 | Abrahamsson | G02B 21/367 359/571 |
| 2014/0263963 A1* | 9/2014 | Broxton | G02B 21/367 250/208.1 |
| 2015/0036038 A1* | 2/2015 | Horstmeyer | G01N 23/205 348/342 |
| 2015/0168702 A1* | 6/2015 | Harris | G02B 21/08 850/30 |
| 2015/0355449 A1* | 12/2015 | Orth | G02B 21/16 348/79 |
| 2015/0379695 A1* | 12/2015 | Naruse | H04N 1/409 348/234 |
| 2016/0013015 A1* | 1/2016 | Potocek | G02B 21/002 250/307 |

OTHER PUBLICATIONS

"What is the Light Field?", retrieved from <http://lightfield-forum.com/what-is-the-lightfield/> on Jan. 15, 2015.

Broxton, M. et al., "Wave optics theroy and 3-D deconvolution for the light field microscope", Optics Express, Oct. 21, 2013, 21, 21, 25418-25439.

Prevedel, R. et al., "Simultaneous whole-animal 3D-imaging of neuronal activity using light field microscopy", Nature Methods, published online, May 18, 2014.

Prevedel, R. et al., "Simultaneous whole-animal 3D imaging of neuronal activity using light-field microscopy", User Manual for the Supplementary Software.

Prevedel, R. et al., "Simultaneous whole-animal 3D imaging of neuronal activity using light-field microscopy", Supplementary Information.

Cohen, N. et al., "Enhancing the performance of the light field microscope using wavefront coding", Optics Express, 22, 20, Oct. 6, 2014, 24817-24839.

Levoy, M. et al., "Light Field Microscopy", ACM Transactions on Graphics, 25, 3, 2006, 1-11.

Levoy, M. et al., "Recording and controlling the 4D light field in a microscope using microlens arrays", Journal of Microscopy, 235, 2, 2009, 144-162.

\* cited by examiner

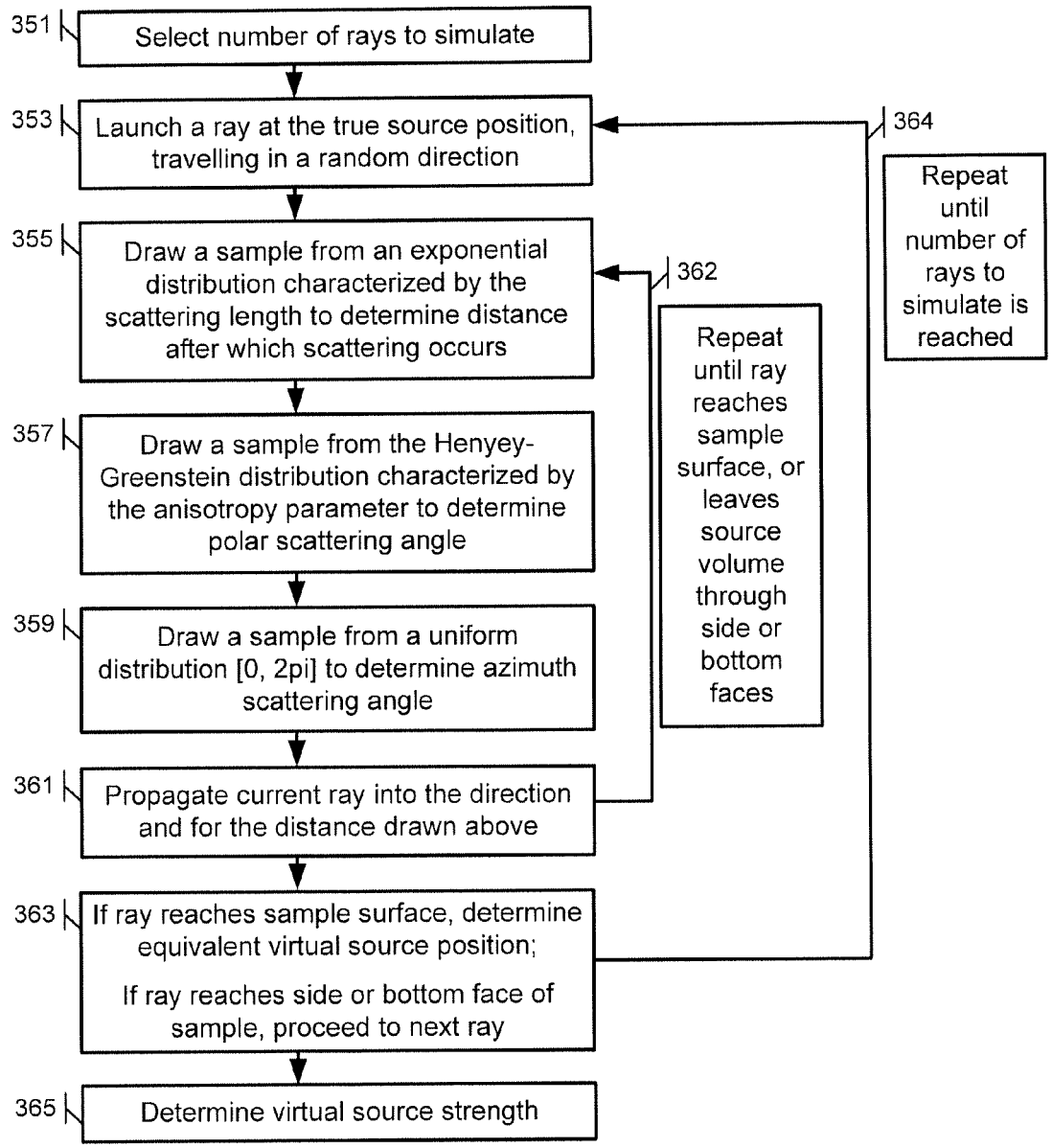

ENHANCING THE RESOLUTION OF THREE DIMENSIONAL VIDEO IMAGES FORMED USING A LIGHT FIELD MICROSCOPE

TECHNICAL FIELD

The present subject matter relates to techniques and equipment for enhancing the imaging resolution of three dimensional functional video recordings formed using light field microscopy.

BACKGROUND

Understanding how sensory inputs are dynamically mapped onto the functional activity of neuronal populations and how their processing leads to cognitive functions and behavior requires tools for non-invasive interrogation of neuronal circuits with high spatiotemporal resolution. A number of approaches for three dimensional (3D) neural activity imaging that take advantage of chemical and genetically encoded fluorescent reporters exist. Whereas some are based on scanning the excitation light in a volume, either sequentially or randomly, others try to capture 3D image data simultaneously by mapping axial information onto a single lateral plane.

Light-field microscopy (LFM) is one such simultaneous 3D imaging method that has been applied to non-biological and fixed biological samples. However, despite its potentially superb temporal resolution, LFM has not generally been used for functional biological imaging. This is because capturing the light-field information via a single sensor image comes at the cost of reduced spatial resolution and because of inherent trade-offs between axial imaging range and the spatial and axial resolution.

A need therefore exists for methods for providing simultaneous functional imaging of phenomena at high magnification levels, for large sample sizes and at high resolution, for example for recording neuronal activity at single-neuron resolution in an entire *caenorhabditis elegans* (*C. elegans*) and in larval zebrafish brain. Specifically, a need exists for high-speed, high resolution, large-scale 3D imaging at high magnification levels capable of recording time dynamics of systems at very small scales, including biological systems.

SUMMARY

In one general aspect, the instant application describes methods and systems for forming three dimensional video recordings of imaging targets at high resolution.

According to one aspect of the present disclosure, a method of forming a three dimensional video recording of an imaging target is provided. The method includes mounting an array of microlenses between the imaging target and an image sensor. A light field point spread function (PSF), characterizing a propagation of a wavefront from a point source collocated with the imaging target through the array of microlenses to the image sensor, is determined based on measured calibration parameters of the array of microlenses. Characteristics of light scattered in the imaging target and reaching the array of microlenses are computed, based on light scattering parameters of a light scattering medium of the imaging target. In turn, a scattering light field PSF, characterizing a propagation of a wavefront from a point source located within the light scattering medium of the imaging target through the array of microlenses to the image sensor, is determined based on the light field PSF and the characteristics of light scattered in the imaging target. Finally, 3D volumetric information of the imaging target is produced from a 2-dimensional (2D) recording of the imaging target, using the determined scattering light field PSF.

The producing of the 3D volumetric information of the imaging target can further include recording, using the image sensor, the 2-dimensional (2D) recording of the imaging target through an objective lens and the array of microlenses. A transfer function, characterizing a propagation of wavefronts from sample points throughout a sample volume of the imaging target through the light scattering medium of the imaging target and the microlens array to the image sensor, is determined based on the determined scattering light field PSF. In turn, a light field 3-dimensional (3D) deconvolution is performed on the recorded 2D recording of the imaging target, based on the determined transfer function, to produce the 3D volumetric information of the imaging target from the recording.

The recording may include recording, using the image sensor, a 2-dimensional (2D) video recording of the imaging target, and the producing the 3D volumetric information of the imaging target may include producing 3D volumetric video information of the imaging target.

The method can further include determining, based on the medium of the imaging target, the light scattering parameters of a light scattering medium of the imaging target. The light scattering parameters may include a light scattering length, a light scattering anisotropy, and a light scattering depth.

The computing characteristics of light scattered in the imaging target can include selecting a plurality of sample points within an imaging volume; and for each of the plurality of sample points, performing a Monte-Carlo simulation of light scattering of light rays emanating from the sample point.

According to one aspect of the present disclosure, a system is provided for forming a three dimensional recording of an imaging target. The system includes an image sensor, an array of microlenses, and a processing system. The image sensor is configured to record a 2-dimensional (2D) video of an image projected onto the image sensor. The array of microlenses is disposed between the imaging target and the image sensor, and is disposed in the light path of the camera sensor to project onto the image sensor an image of the imaging target. The processing system is communicatively connected to the image sensor and configured to perform functions. These functions include functions to determine, based on measured calibration parameters of the array of microlenses, a light field point spread function (PSF) characterizing a propagation of a wavefront from a point source collocated with the imaging target through the array of microlenses to the image sensor; compute, based on light scattering parameters of a light scattering medium of the imaging target, characteristics of light scattered in the imaging target and reaching the array of microlenses; determine, based on the light field PSF and the characteristics of light scattered in the imaging target, a scattering light field PSF characterizing a propagation of a wavefront from a point source located within the light scattering medium of the imaging target through the array of microlenses to the image sensor; and produce, using the determined scattering light field PSF, 3D volumetric information of the imaging target from a 2-dimensional (2D) recording of the imaging target.

The function to produce the 3D volumetric information of the imaging target may include functions to: record, using the image sensor, the 2-dimensional (2D) recording of the imaging target through a microscope objective lens and the array of microlenses; determine, based on the determined scattering light field PSF, a transfer function characterizing a propagation of wavefronts from sample points throughout a sample volume of the imaging target through the light scattering medium of the imaging target and the microlens array to the image sensor; and perform on the recorded 2D recording of the imaging target, based on the determined transfer function, a light field 3-dimensional (3D) deconvolution to produce the 3D volumetric information of the imaging target from the recording.

The function to record may include a function to record, using the image sensor, a 2-dimensional (2D) video recording of the imaging target, and the function to produce the 3D volumetric information of the imaging target may include a function to produce 3D volumetric video information of the imaging target.

The processing system may be further configured to perform a function to determine, based on the medium of the imaging target, the light scattering parameters of a light scattering medium of the imaging target. The light scattering parameters may include a light scattering length, a light scattering anisotropy, and a light scattering depth.

The function to compute characteristics of light scattered in the imaging target may include functions to: select a plurality of sample points within a volume of the imaging target; and for each of the plurality of sample points, perform a Monte-Carlo simulation of light scattering of light rays emanating from the sample point.

According to a further aspect of the present disclosure, a method of forming a three dimensional recording of an imaging target is provided. The method includes recording, using a two-photon, multi-photon, or confocal excitation microscope, a three-dimensional image of the imaging target. Cell body locations are identified in the imaging target based on the recorded three-dimensional image recorded using the excitation microscope. A 2-dimensional (2D) recording of the imaging target is recorded using a light field microscope including an array of microlenses. A light field 3-dimensional (3D) deconvolution is performed on the 2D recording of the imaging target to produce 3D volumetric information of the imaging target from the recording. In turn, for each cell body location identified using the excitation microscope, a time series signal representing activity at and around the identified cell body location is extracted from the 3D volumetric information of the imaging target.

The extracting of the time series signal for each respective cell body location may include computing a weighted sum of the 3D volumetric information at and around the respective cell body location at each of a plurality of time points of the time series signal. Coefficients of the weighted sum may be selected from a 3D Gaussian spatial filter.

The extracting of the time series signal may further include determining a spatial shift in a position of the imaging target; and for each respective cell body location, computing a weighted sum of the 3D volumetric information at and around an adjusted location of the respective cell body at each of a plurality of time points of the time series signal. The adjusted location of the respective cell body may be determined based on the spatial shift in the position of the imaging target.

The spatial shift in the position of the imaging target may be performed using at least one of non-negative matrix factorization and Bayesian MAP estimation.

The method may further include performing temporal de-convolution of the extracted time series signal based on a model of the time dynamics of neuronal activity.

According to another aspect of the present disclosure, a system is provided for forming a three dimensional recording of an imaging target. The system includes a two-photon, multi-photon, or confocal excitation microscope, a light field microscope, and a processing system. The two-photon, multi-photon, or confocal excitation microscope is configured to record three-dimensional images of the imaging target. The light field microscope includes an array of microlenses and is configured to record 2-dimensional (2D) recordings of the same imaging target. The processing system is communicatively connected to the two-photo excitation microscope and to the light field microscope, and is configured to perform various functions. The various functions include functions to record, using the excitation microscope, a three-dimensional image of the imaging target; identify, based on the recorded three-dimensional image recorded using the excitation microscope, cell body locations in the imaging target; record, using the light field microscope, a 2-dimensional (2D) recording of the imaging target; perform on the 2D recording of the imaging target, a light field 3-dimensional (3D) deconvolution to produce 3D volumetric information of the imaging target from the recording; and for each cell body location identified using the excitation microscope, extract from the 3D volumetric information of the imaging target a time series signal representing activity at and around the identified cell body location.

The function to extract the time series signal for each respective cell body location may include a function to compute a weighted sum of the 3D volumetric information at and around the respective cell body location at each of a plurality of time points of the time series signal. Coefficients of the weighted sum may be selected from a 3D Gaussian spatial filter.

The function to extract the time series signal may further include functions to: determine a spatial shift in a position of the imaging target; and for each respective cell body location, compute a weighted sum of the 3D volumetric information at and around an adjusted location of the respective cell body at each of a plurality of time points of the time series signal. The adjusted location of the respective cell body may be determined based on the spatial shift in the position of the imaging target.

The spatial shift in the position of the imaging target may be performed using at least one of non-negative matrix factorization and Bayesian MAP estimation.

The processing system may further be configured to perform a function to: perform temporal de-convolution of the extracted time series signal based on a model of the time dynamics of neuronal activity.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A and 3B are high-level flow diagrams of a method for forming 3D video recordings using light field microscopy while accounting for light scattering within the imaging target.

DETAILED DESCRIPTION

Figure 1:
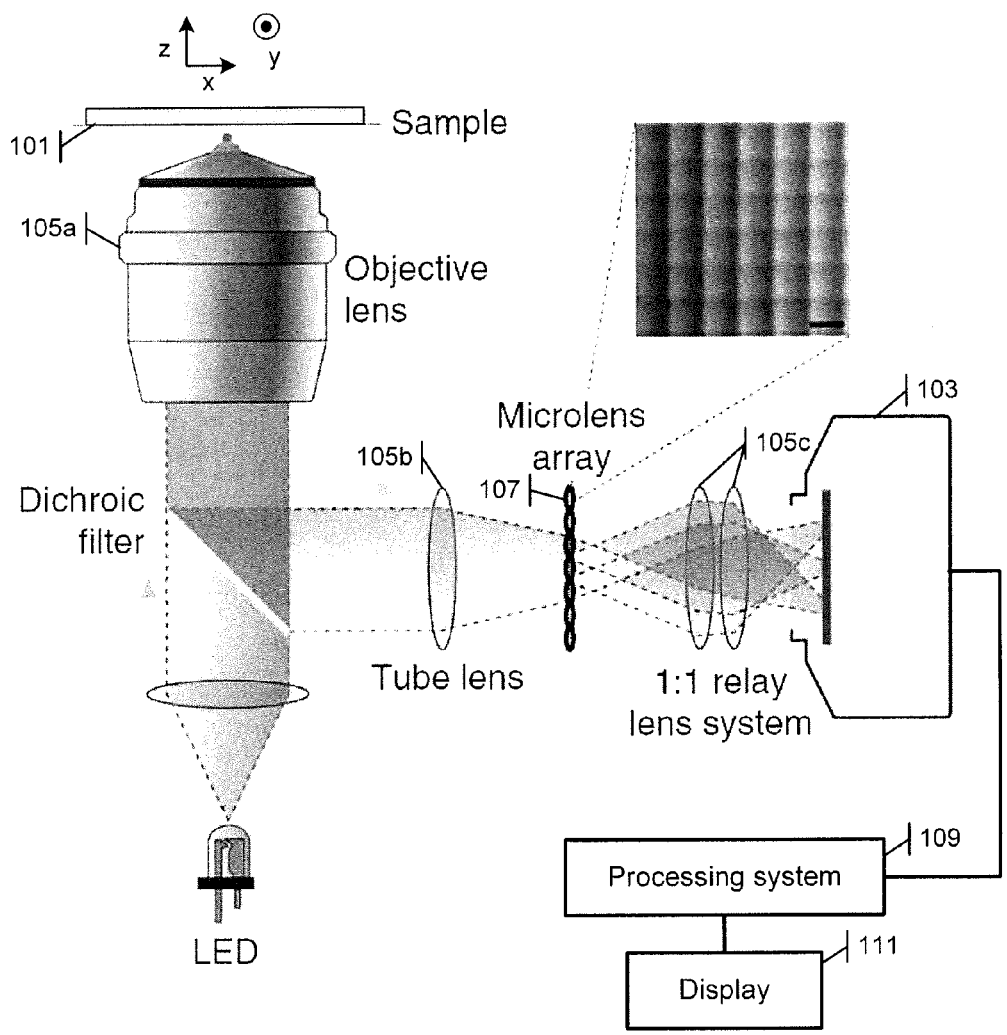
FIG. 1 is a high-level functional block diagram of a light field microscope configured for three dimensional (3D) video imaging.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various techniques and equipment disclosed herein relate to forming three dimensional video recordings of imaging targets using light field microscopy. The three dimensional video recordings are formed from data captured by two dimensional camera sensors (e.g., an sCMOS or CCD camera sensor) by recovering three dimensional information from captured two dimensional data. The three-dimensional video recordings may include video recordings storing information on the visual appearance and timing of phenomena occurring in the imaging target, and the location of the phenomena in three-dimensional space. The three-dimensional video recordings thus include information on four dimensions of the imaging target, including three spatial dimensions and time dimension. Techniques and equipment for forming the three-dimensional video recordings using light field microscopy are described in relation to FIG. 1 and FIGS. 2A-2D.

Additionally, the disclosure details techniques and equipment for enhancing the imaging resolution of three dimensional video recordings of imaging targets formed using light field microscopy. Specifically, in accordance with first techniques, imaging resolution is enhanced by accounting for light scattering that occurs in the imaging target. In accordance with the first techniques, light scattering is modeled based on characteristics of the imaging target, and the effects of the light scattering through the light field microscope are determined. A revised light field point-spread function (PSF) is calculated based on the determined light scattering effects, and the revised light field PSF is used to retrieve the 3-dimensional (3D) volumetric information of the imaging target from recorded video recordings. The first techniques are described in relation to FIGS. 3A-3D among other locations in the application.

In accordance second techniques, imaging resolution is enhanced by using two different imaging modalities to reconstruct the 3D volumetric information of the imaging target. In accordance with the second techniques, in addition to using light field microscopy as a first imaging modality, a second 3D imaging modality is used to record a 3D image of the imaging target. The second imaging modality may be two-photon (2P) excitation microscopy, multi-photon microscopy, or confocal excitation microscopy. The 3D image obtained using the second imaging modality is used to identify the locations of nuclei in the imaging target. In turn, the light field microscope is used to record video of the imaging target and obtain 3D volumetric information. Time series signals are then extracted from the 3D volumetric information at each identified nucleus location. The second techniques are described in relation to FIGS. 4A-4C among other locations in the application.

Reference now is made in detail to the examples illustrated in the accompanying drawings and discussed below.

FIG. 1 illustrates a system 100 for forming three dimensional video recordings of imaging targets using light field microscopy. The system 100 can take the form of a microscope, but can more generally take the form illustrated in FIG. 1. The system 100 includes a mount 101 for mounting a sample to be recorded, a camera 103 for recording video of the imaging target using a camera sensor, and one or more lenses 105a-c (referenced generally herein as lens(es) 105) in a light path between the mount 101 and the camera 103 for focusing images of the sample on the camera sensor. Additionally, the system 100 includes a microlens array 107 disposed in the light path between the mount 101 and the camera 103 for focusing images of the sample on the camera sensor. The microlens array 107 is an array including a plurality of miniature lenses that are disposed adjacent to each other so as to be spaced evenly in the array 107. The microlens array 107 may be characterized by a microlens array pitch, corresponding to a distance between adjacent microlenses in the array 107. The pitch may further correspond to the diameter of the microlenses, for example in arrays in which microlenses are directly adjacent to, tangent to, or in contact with each other. Lenses of the array 107 are further characterized by a curvature, corresponding to the radius of curvature or other measure of curvature of the individual microlenses in the array. The curvature may be associated with or correspond to the focal length of each lens. Note that in some examples, the microlens array 107 may be replaced with another diffractive element. The methods described herein could then be used in association with the diffractive element to provide three dimensional video recording.

The system 100 is operative to capture and record 3D volume information from a sample using a two-dimensional (2D) camera sensor. By way of explanation, a conventional 2D microscope captures a high-resolution image of a specimen that is in focus in front of the microscope's objective. For volumetric specimens, the same image captured in two dimensions also contains blurred contributions of areas that are optically out of focus. Unmixing the out-of-focus contributions in post-processing of the image is an ill-posed problem, and identifying the out-of-focus contributions is therefore usually not possible from the captured two-dimensional image. However, the out-of-focus contributions can nonetheless be identified through post-processing using a deconvolution method based on light-field microscopy as described below.

Other imaging techniques, such as techniques using scanning microscopes, address this problem by sequentially measuring each point in the 3D volume individually. The scanning process undertaken by the scanning microscope is time-consuming and, because each point is measured at a different/sequential point in time, the resulting measurement data is not adequate or appropriate for capturing and analyzing dynamic events or moving specimens. In particular, the measurement data obtained from a scanning microscope is not adequate for analyzing dynamic events having time scales that are shorter than or on the order of the time needed to perform an entire sequential scan of the desired volume or plane by the scanning microscope.

In contrast, system 100 operates as a light field microscope having an innovative optical acquisition setup to capture different primitives. Specifically, instead of recording individual points sequentially, the system 100 captures "rays" of light and their summed emission through the 3D sample volume. Instead of recording them in sequence, a set of "rays"—the light field—is multiplexed through the microlens array 107 into a single 2D image on the image sensor. The microlens array 107 thereby spatially multiplexes information from the sample volume, rather than temporally multiplexing the information as in the scanning microscope. The spatial multiplexing approach drastically improves acquisition speed at the cost of reduced spatial resolution. To recover the 3D volume information from the measured 2D emission image, a computed tomography problem is solved in processing system 109. The flow diagrams of FIGS. 2A-2D and the related descriptions outline the steps involved in designing, calibrating, and operating the image capture system, and the steps involved in performing reconstruction operations including a deconvolution operation. While the light field is conceptually comprised of geometric rays, in practice the image formation and inversion also considers diffraction.

To solve the computed tomography problem, the camera sensor 103 is connected to a processing system 109 configured to process 2D video recording signals and recover 3D volume information from the 2D video recordings. The processing system 109 is shown as a single processing system 109 in FIG. 1. The processing system 109, however, may include a plurality of interconnected processors that are located in a same location or distributed across multiple locations (e.g., in communication with each other across one or more networks) and that provide sufficient processing power to efficiently perform a 3D deconvolution as described herein. In particular, the processing system 109 may perform steps of process 200 (including the steps 207, 209, and 221-293 described below in relation to FIGS. 2A-2D) to form 3D video recordings of imaging targets using light field microscopy. The processing system 109 may use parallel computing methods across multiple cores, and/or may use central processing unit (CPU) or graphics processing unit (GPU) based processing, to efficiently process the 2D video recordings and recover 3D volume information. A display 111 is optionally connected to the processing system 109 to display and visualize video images of reconstructed 3D volumetric information.

As described above, the system 100 includes lens(es) 105 which may include an objective lens 105a, a tube lens 105b, and relay lens(es) 105c of a macro camera objective relay lens system (e.g., a 1:1 relay lens system). The lens may include microscope-type lenses, camera-type lenses, as well as lenses configured for optically connecting a camera to a microscope. The camera 103 generally includes a digital camera sensor such as a scientific complementary metal-oxide-semiconductor (sCMOS) sensor, a charge-coupled device (CCD), or other 2D array sensors configured for use in digital cameras. The camera sensor includes an array of individual pixels each operative to sense the presence, intensity, and color of light incident thereon. In general, the relay lens(es) 105c focus an image received from the microlens array 107 onto the camera sensor. In some examples, the system 100 additionally includes components for illuminating the imaging sample or target, such as the light emitting diode (LED), lens, and dichroic filter illustratively shown in FIG. 1. Additional or alternative lighting means can also be used.

FIGS. 2A-2D are flow diagrams outlining steps of a method 200 for forming three dimensional video recordings of imaging targets using light field microscopy. The process can be implemented using the system 100 of FIG. 1.

At a high-level, the method 200 includes three stages. In a first stage including steps 201-217, the system 100 (e.g., a light field microscope) is designed for use with a particular imaging target, for example by selecting system parameters tailored to imaging the particular target. The system 100 is then assembled and calibrated based on the optimized design. In a second stage including steps 219-229, a video recording is performed using the assembled system 100, and the 3D volume data is recovered using calibration parameters of the system 100 with which the video is recorded (e.g., calibration parameters according to which the system 100 was designed, and calibration parameters that were measured from the system 100). Finally, in the third stage including steps 231-233, post-processing of the recovered 3D video recorded volume data is performed to extract additional information therefrom.

The process begins in step 201 in which a sample serving as an imaging target is mounted on the mount 101, and a sample volume of the imaging target is selected for three dimensional video recording. The selection of the sample volume includes selection of a volumetric region that will be imaged in three dimensions (e.g., x, y, and z dimensions). In general, the sample volume is a rectangular cuboid. The sample volume can include the entire imaging target or only a portion of the imaging target. In some examples, the sample volume extends beyond the imaging target, such that the imaging target occupies only a portion of the sample volume.

As part of step 201, the imaging resolutions are selected. The selection of the imaging resolutions can include selection of an imaging resolution along each one of the three dimensions (x, y, and z dimensions). In general, the resolutions along the x and y dimensions are selected to be the same, while a resolution along the z (axial) dimension is selected independently. The x-y plane (and x-y dimensions) is defined as a plane that is parallel to the objective lens 105a, while the z dimension is defined as a direction orthogonal to the object lens 105a. The selection of the resolutions may be based on a tradeoff with the size of the imaging volume: selection of a large imaging volume generally results in a selection of lower imaging resolutions, while selection of a small imaging volume can enable selection of high imaging resolutions within the small volume.

In step 203, the sensor size and pixel size are selected for the camera 103 and the camera sensor. As noted above, the camera sensor generally is a digital camera sensor such as a chip of a scientific complementary metal-oxide semiconductor (sCMOS) camera. In general, the sensor size and pixel size are set for a given camera sensor, and the selection of the image and pixel size in step 203 may include selection of a camera 103 and associated camera sensor that have the desired image and pixel sizes. Additionally, the desired sensor size and pixel size may be functions of the sample volume and imaging resolutions selected in step 201. For example, a large sensor size and/or a small pixel size may be needed to image a large sample volume at high imaging resolutions. The selection of the image and pixel size may thus involve computing the image and pixel sizes needed to image the sample volume selected in step 201 at the resolutions selected in step 201. In one example, an sCMOS camera having a 5.5-Megapixel sensor (2,560×2,160 pixels, pixel size 6.5 um) is used.

In step 205, the objective lens 105a (of the lenses 105a-c) is selected. The selection of the objective lens includes selection of the magnification and numerical aperture (NA) of the lens. Light field microscopes support all objective magnifications, and microlenses 107 are matched with the NA of the employed objective. Further, resolutions in all three dimensions are set by the objective and microlens properties, and field of view (FOV) and acquisition rate are determined by the camera chip size, frame rates and signal intensity. In various examples, a 40×/0.95-NA dry objective was used to image *C. elegans*, while a 20×/0.5-NA dry objected was used to image zebrafish. Additionally, lenses 105b and 105c can be selected in this step. In one example, the relay lens 105c is selected as a 1:1 relay macro lens objective.

Once the lenses are selected, parameters of the microlens array 107 are determined based on the selected sample volume, imaging resolutions, image and pixel size, and objective parameters in step 207. The microlens array 107 parameters include a pitch, corresponding to a distance between adjacent microlenses in the array 107, and a curvature, corresponding to the radius of curvature or other measure of curvature of the individual microlenses in the array. The curvature may be associated with or correspond to the focal length of each lens. Once the appropriate microlens parameters are determined, the microlens array 107 can be fabricated, and the microlens array 107 mounted inside a five-axis kinematic mount to allow fine adjustment of the array orthogonal to the optics axis of the system 100. In one example, microlenses with a 150 µm pitch (e.g., a 150 µm diameter) are used, and the microlenses are selected to have an effective focal length of 3 mm.

Steps 201-207 can be iteratively performed as part of designing the system 100 to image a particular target sample. Specifically, since the parameters selected in steps 201-207 are highly interdependent, the iterative design process may enable the parameters to be adjusted to achieve desired or optimal performance criteria. As shown at step 209, the iterative process can include establishing a model of the light field deconvolution microscopy (LFDM) system 100, performing calculations and simulations using the model having the parameters established in steps 201-207, and adjusting the parameters in steps 201-207 based on the outcome of the calculations and simulations to achieve the desired performance objective.

The choice of objective (step 205) and microlens array (step 207) influence or determine the spatial resolution and sample volume (e.g., field-of-view) in all three dimensions (x, y, and z dimensions). The pitch of the microlens array, i.e. the distance between the microlenses, in combination with the imaging sensor's pixel size and objective magnification controls trade-off between spatial resolutions vs. field-of-view. Meanwhile, the objective's magnification and numerical aperture control axial resolution vs. axial range. Further, the field-number of the microlenses is preferably matched to the field-number of the objective in order to preserve the maximum angular information in the light fields.

Due to the variation in sampling density resulting from use of the microlens array 107, reconstructed volumes can have lateral resolutions (e.g., in the x-y plane) that vary along the optical axis (e.g., along the z-axis in a direction closer to and further from the objective lens). On the focal plane, achievable resolution is equivalent to conventional light field microscopy (LFM), i.e. the size of each microlens divided by the magnification of the objective lens (e.g., 150 µm/40×=3.75 µm in one system). The resolution increases for lateral sections close to the focal plane, by around 1.5 µm laterally in one implementation, but drops at larger distances from the focal plane, e.g. to about 3 µm laterally at −25 µm. Similar behavior was experienced with a 20×0.5 NA lens used in zebrafish recordings in which maximum resolutions of around 3.4 µm laterally and around 11 µm axially were obtained based on a reconstructed point spread function (PSF). In general, spatial/volumetric resolutions on the order of 1 µm to 15 µm can be achieved.

The microlens array 107 can be designed for higher magnification objectives in order to look at smaller samples. For example, microlenses can be designed taking into account the trade-offs between lateral (x, y plane) and axial (z-plane) resolutions. For instance, simulations for a 100× 1.4 NA oil objective having an f-number matched microlens of 100 µm pitch indicate that a resulting LFDM should have a resolution of around 0.27 µm laterally and 1 µm axially. The simulations indicate a lateral field of view of 140 µm with a useful axial range of 10-15 µm.

Once the parameters for the system 100 are selected in steps 201-209, the microlens array 107 having the selected characteristics is fabricated in step 207 and mounted in a kinematic mount to allow fine adjustment of the array orthogonal to the optics axis. The system 100, including the components selected and designed in step 201-209, is assembled in step 211. The assembly of the microscope includes mounting the microlens array 107 between the microscope tube lens 105b and the image sensor, and in particular may include mounting the microlens array 107 at a location of optical focus of the tube lens 105b in the embodiment shown in FIG. 1. The assembly of the microscope further includes aligning of the microlens array 107 with the camera sensor in step 213. The alignment is performed to ensure that the microlens array 107 is parallel to the camera sensor, that a square grid layout of the microlenses in the array 107 is aligned with the square grid layout of individual pixels of the camera sensor, and that centers of microlenses in the array are aligned with centers of pixels of the camera sensor. The alignment can involve aligning the microlens array and camera sensor in six separate degrees of freedom (e.g., alignment of position in three dimensions, as well as alignment of rotation, tilt, and tip). As shown in step 215, the alignment of the microlens array and camera sensor may rely on Köhler illumination (e.g., using lighting in which incoming rays are parallel to each other) and evenly fluorescent slides to perform the alignment process. For example, the alignment can be performed by capturing calibration images that show a fluorescent slide and a collimated beam, and adjusting the position of the microlens array 107 based on the captured calibration images.

In turn, the sample is mounted in mount 101 and the imaging target (which may correspond to the sample or to a portion of the sample that is to be imaged) is positioned in the desired focal plane in step 217. The positioning of the imaging target includes positioning the imaging target at a desired distance from the objective lens 105a such that the imaging target is positioned in the desired focal plane. In general, the resolution of the system 100 is highest at a position outside of the focal plane, and the imaging target can therefore advantageously be positioned in step 217 at a position proximate to but offset from the focal plane so as to place the imaging target in a region having the highest resolution.

Once the sample is appropriately mounted, the system 100 records video of the imaging target using the camera sensor in step 219. The recording is performed with the camera sensor that captures a series of sequential 2D images produced on the image sensor by the microlens array 107. The 2D images, however, include 3D volume information. Specifically, each 2D image encodes 3D volume information for a plurality of sample points distributed throughout the sample volume at a same instant in time such that precise location and timing information is captured. The recording of the video images is performed at a selected number of frames per second, for example in the range of 5 frames per second (or 5 Hz) to 50 frames per second (or 50 Hz). The recording rate of frames per second can be selected based on the application or phenomenon being recorded and the speed at which the phenomenon occurs.

Following the capture of the video recording, the processing system 109 of system 100 reconstitutes in steps 221-229 the 3D video volume information from the recorded 2D video and the calibration parameters of system 100. As part of the reconstruction of the 3D volume information, the recorded video images are rectified in step 221. The image rectification is performed on the basis of instrument calibration data including calibration data indicating the size and location of each microlens with respect to pixels of the image sensor (e.g., as may be set and/or measured in steps 213 and 215). The image rectification may further be performed on the basis of instrument calibration data that is set or measured as part of performing steps 201-209 and relating to the camera sensor 103, the lenses 105, the microlens array 107, interactions between these components, and the relative positions of the components.

The image rectification can also be based in part on a lens sampling parameter $F_{Num}$ that characterizes the number of pixels of the camera sensor that are associated with or aligned with each microlens. In some examples, the lens sampling parameter $F_{Num}$ is in the range of 10-15 pixels/lens, although other values of the lens sampling parameter $F_{Num}$ can be used. Prior to performing step 221, an appropriate or adequate value may be selected in step 223 for the lens sampling parameter $F_{Num}$ used by system 100 in performing steps 221-229.

In step 225, a light field point spread function (PSF) is determined for the system 100. The light field PSF is a function that relates a point source located in the sample volume with each of a plurality of locations on the image sensor at which the point source appears. In this respect, because of the image distortion created by the array of microlenses 107 used in system 100, several pixels of the camera sensor may receive substantially similar information from a same point in the sample volume. For example, a point source aligned with the center of a microlens located in the center of the microlens array may produce multiple identical (or similar) artifacts in each of the four cardinal directions on the camera sensor. As part of extracting the 3D volume information from the recorded 2D images, the PSF identifying pixels that receive similar or identical information from the sample volume are identified in step 225. By way of example, a captured PSF may be obtained for a subdiffraction-sized bead located at a center of the sample volume at a depth of z=7.5 μm off the focal plane.

In order to determine the light field PSF, a multi-step process is undertaken. A PSF oversampling ratio (OSR) is selected in step 227, the OSR being an independent variable that determines the level of oversampling that is performed in the x-y plane on the image sensor. For example, an OSR of 3 would result in the PSF generating three sample points for each pixel of the image sensor, while an OSR of 16 would result in the PSF generating sixteen sample points for each pixel of the image sensor. Values at the three, sixteen, or other multiple sample points can then be filtered (e.g., averaged, thresholded, or the like) to determine a single value for each pixel of the image sensor. The oversampling can lead to captured images being resampled to contain a selected number of samples. For example, the captured images can be resampled to contain 15×15 angular light field samples under each microlens, or 11×11 angular light field samples under each microlens. In some examples, the target axial resolution of reconstructed volumes is 2 μm, which may require 12-16 z-slices for worm samples (*Caenorhabditis elegans*).

In other examples, the target axial resolution of reconstructed volumes is 4 μm, which may require 51 z-slices for zebrafish samples.

Figure 2A:
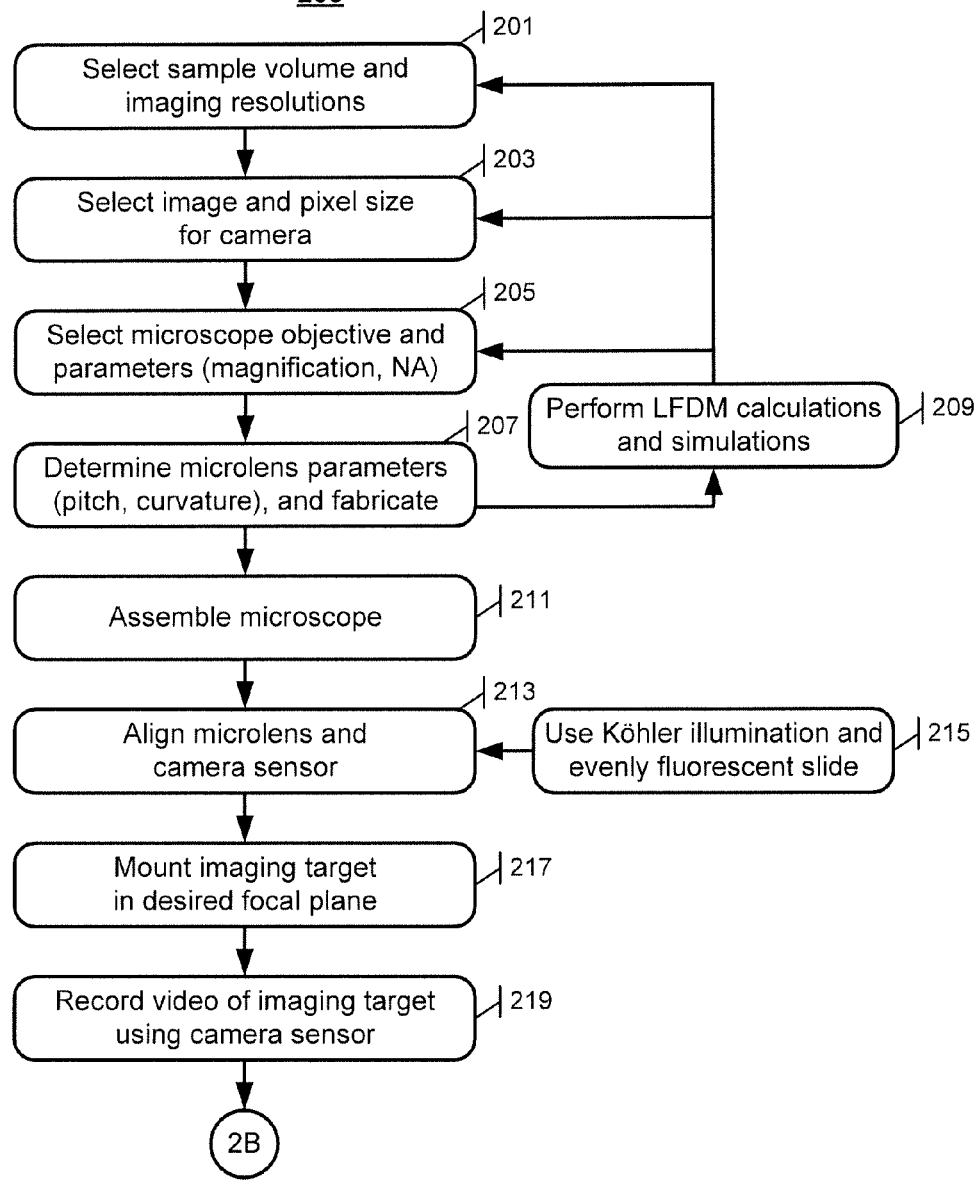
FIGS. 2A through 2D are high-level flow diagrams of a method for forming 3D video recordings using light field microscopy.
Figure 2B:
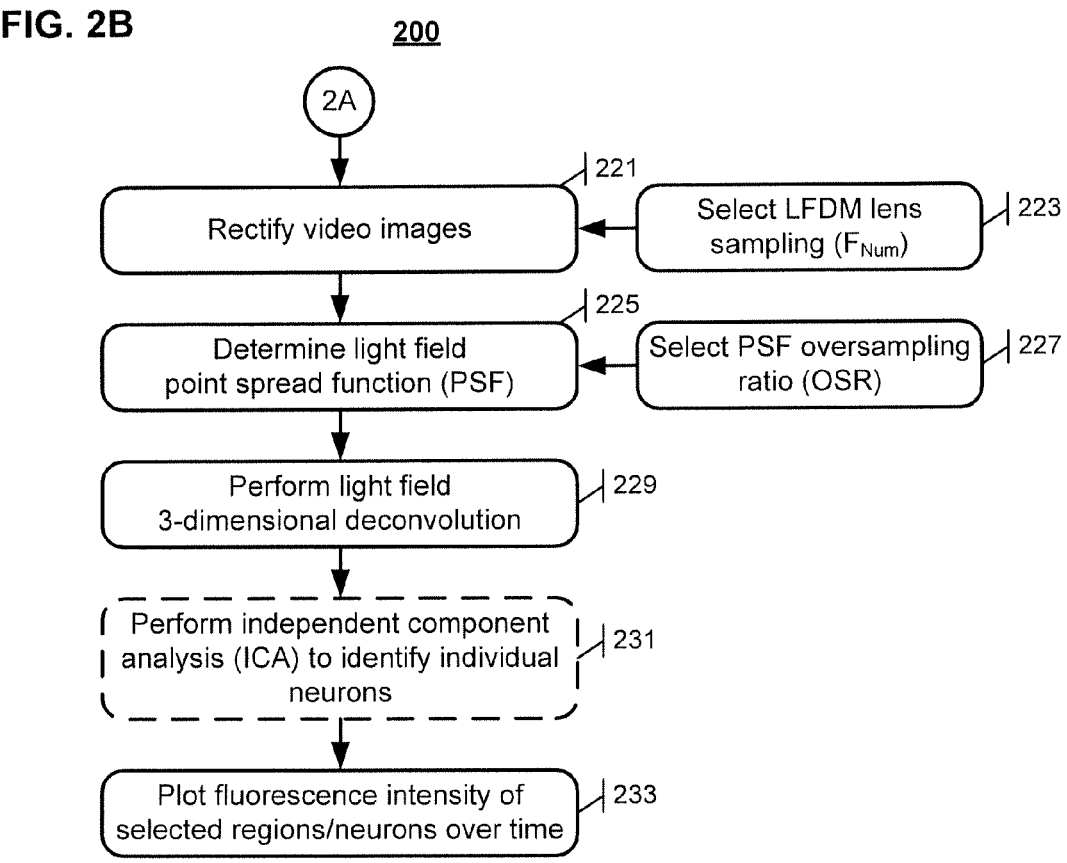
Figure 2C:
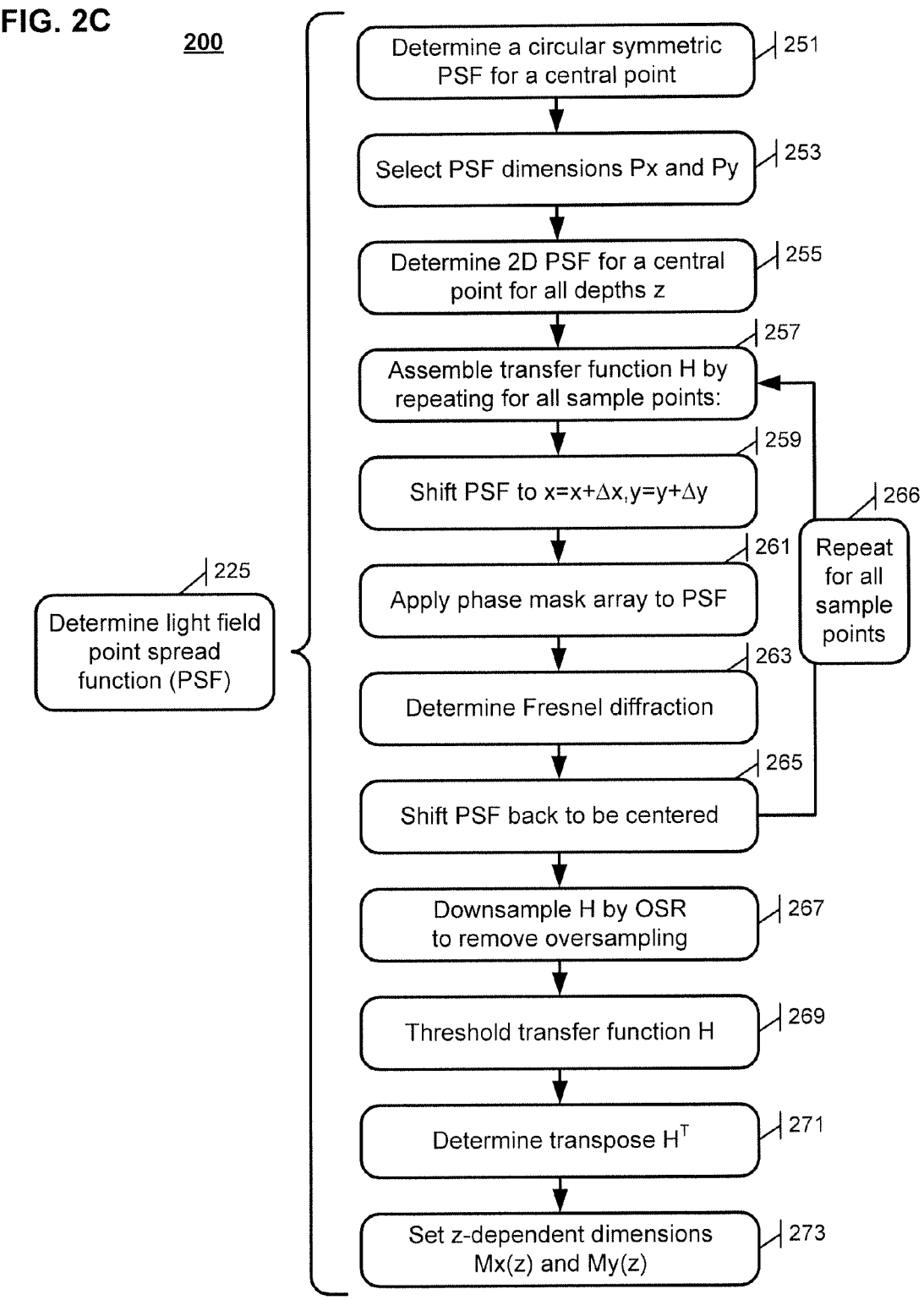
Figure 2D:
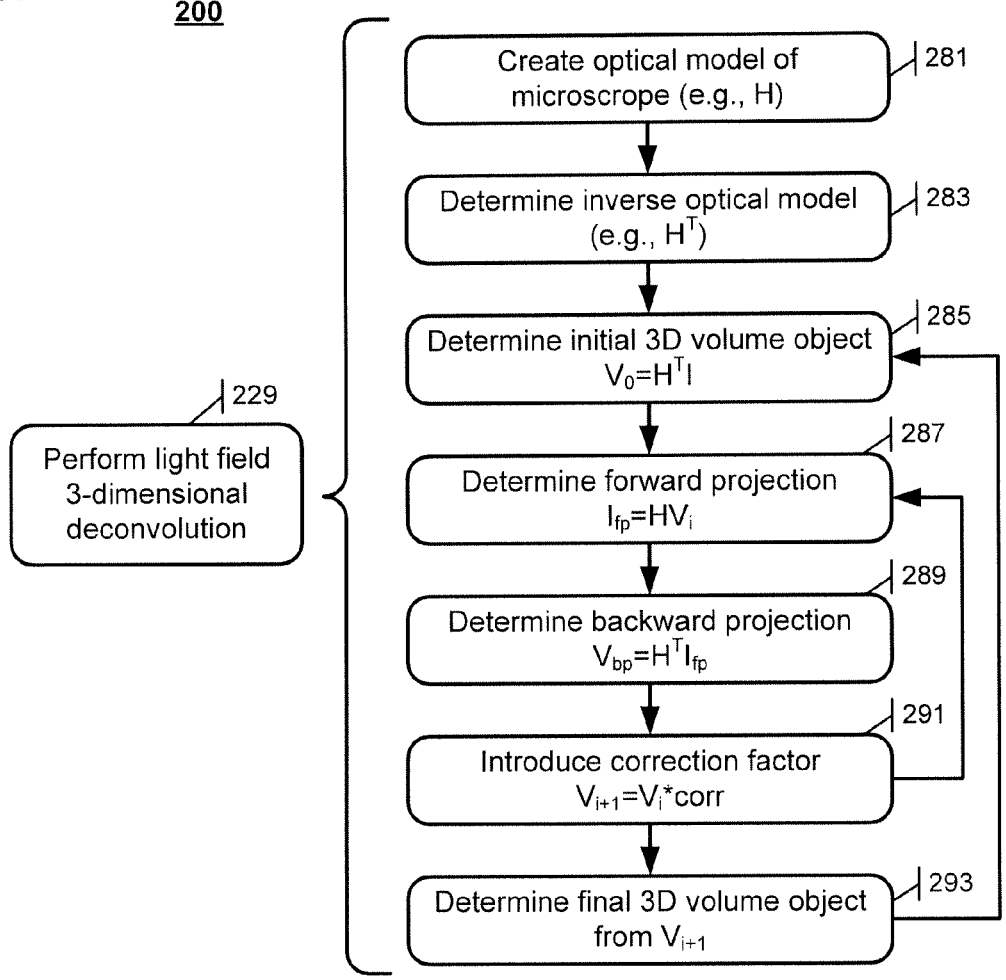

The detailed steps involved in determining the light field PSF of step 225 are described in detail in relation to steps 251-273 of FIG. 2C. To generate the PSF, a wavefront propagated through the microlens array is determined for multiple points in the sample volume. The determination can be performed based on scalar diffraction theory through the microlens array 107. To faithfully represent the high spatial frequency components of the wavefront, computations can be performed with a spatial oversampling factor (e.g., an oversampling factor of 3) compared to the size of the virtual pixels that correspond to the resampled image.

As part of determining the light field PSF, the PSF is generally assumed to be a circular symmetric function because the microlens array is itself circular symmetric. The assumption that the PSF is circular symmetric provides for an increase in efficiency of computations involving the PSF. Hence, in step 251, the circular symmetric PSF is calculated for a point located at a center of the sample volume (defined by coordinates x=0, y=0) and with an axial position at the lowest z-depth considered corresponding to the z-plane closest to the objective lens 105a of system 100 (or, alternatively, with an axial position at the highest z-depth considered, corresponding to the z-plane furthest away from the objective lens 105a). In a case in which the sample volume is a rectangular cuboid, the point located at the center of the sample volume (defined by coordinates x=0, y=0) is the point located at the center of the cuboid for which the circular symmetric PSF is calculated.

In step 253, dimensions Px and Py are selected for the PSF along the x and y directions, respectively, for each image plane (e.g., z-plane). The selected dimensions are used to constrain the virtual size (e.g., in units of pixels) over which the PSF is calculated, so as to increase computation efficiency. Specifically, the selected dimensions Px and Py are used to effectively set to zero values of the PSF that extend outside of the Px and Py dimensions. Generally, the values of the PSF that fall outside of the selected dimensions are very small and can therefore be effectively set to zero without having a substantial effect on the results of calculations performed using the PSF. In general, the Px and Py values are set to be the same (e.g., Px=Py), although in some examples different values are used. In one example, Px=Py=50, such that the PSF is limited to an array of 50×50 numbers (corresponding to 50×50 pixels). Note that the Px and Py values may change for each image plane, in which case Px(z) and Py(z) values are determined for each image plane.

In step 255, the 2D PSF is determined for a central point located at a center of the sample volume (defined by coordinates x=0, y=0) for each of the considered z-depths through the sample volume. The 2D PSF is thus calculated at each respective one of a plurality of different z-depths for a point source located at a center of the x-y plane in the sample volume at the respective z-depth. The 2D PSF is determined based on the circular symmetric PSF determined in step 251.

In turn, at step 257, the transfer function H function is assembled characterizing the propagation of wavefronts from sample points throughout the sample volume of the imaging target through the lens(es) 105 and microlens array 107 to the image sensor. The transfer function H is used to recover from each captured 2D video image the 3D sample volume of the imaging target that gave rise to the recorded 2D video image. The transfer function H relates I, the captured light field video image, and V, the sample volume being reconstructed. Specifically, the transfer function H is such that I=H V. H represents an optical model of the lenses 105, microlens array 107, and image sensor of system 100.

The transfer function H is assembled by performing steps 259-265 for all sample points in the sample volume. The transfer function H is assembled by shifting the PSF of step 255 to be centered at each sample point in the sample volume, and summing together the shifted versions of the PSF. In detail, H is assembled by shifting the PSF by $\Delta x$ and $\Delta y$ along the x and y directions, respectively, in step 259. $\Delta x$ is the pixel pitch along the x axis, defined as the physical distance between pixels in the sensor array along the x axis, adjusted by the objective's and/or lenses' magnification factor(s). $\Delta y$ is the corresponding pixel pitch along the y axis, also adjusted by the objective's and/or lenses' magnification factor(s). The shifted PSF is calculated as $x_{shifted}=x+\Delta x$ and $y_{shifted}=y+\Delta y$. In step 261, the shifted PSF is multiplied by the phase mask array. The phase mask array represents the optical transformation performed by the microlens array 107. In various examples, the phase mask array is determined based on the characteristics of the microlens array 107 (e.g., pitch, curvature, focal length, as determined in step 207) to represent the optical transformation provided by the microlenses. In some examples, the phase mask array is determined based additionally on the alignment of the microlens array with the camera sensor as determined in step 213. In step 263, the Fresnel diffraction of light waves propagating from the sample volume through the lenses 105 and microlens array 107 of the system 100 to the image sensor are computed. The shifted PSF having the Fresnel diffraction applied thereto is added to the transfer function H. In step 265, the PSF is shifted back to its original position ($x=x_{shifted}-\Delta x$ and $y=y_{shifted}-\Delta y$), and steps 257-265 are repeated (shown at 266) for a next sample point in the sample volume.

Once the transfer function H is assembled by iteratively completing steps 257-265 for all sample points in the sample volume, control passes to step 267 in which the transfer function H is downsampled by the OSR to remove oversampling. The downsampling can be performed by preserving only a subset of the sample points (e.g., by preserving every $n^{th}$ sample point, where n is the oversampling ratio), although the downsampling is more commonly performed by filtering or averaging values of the transfer function H to obtain the downsampled transfer function H. The downsampling is performed after calculations for Fresnel diffraction (e.g., in step 263) are completed.

In step 269, the transfer function H is thresholded to obtain sparsity. The thresholding includes selecting an appropriate threshold value to be used for setting small values in the transfer function to zero. Specifically, the thresholding involves setting to zero any value of the transfer function H that is below the selected threshold value, thereby obtaining sparsity in the transfer function H.

The transpose $H^T$ of the transfer function H is computed in step 271. The transpose of the transfer function H is used in computing the inverse of the transfer function H. Specifically, in some examples, the transfer function H is assumed to be orthogonal, and the transpose of the transfer function H is therefore assumed to be equal to the inverse of the transfer function H.

Finally, in step 273, z-dependent dimensions Mx(z) and My(z) are set for determining the size of the transpose matrix $H^T$. This is performed to increase computation efficiency, and the dimensions selected for the transfer function are dependent on the axial position along the z-axis because the spatial extension of the PSF (used to determine H and $H^T$) varies linearly with z-depth.

With the transfer function H and its transpose $H^T$ computed following step 273, step 225 is completed and control passes to step 229 of FIG. 2B. In step 229, a 3-dimensional deconvolution is performed on each recorded light field video image. The 3D deconvolution is performed to recover the 3-dimensional volume information of the target volume from each recorded 2D light field video image. The deconvolution is based on forward and backward projections, with update steps involving correction terms incorporated between iterations to improve the accuracy of the deconvolution and recovered 3D volume information. The deconvolution is described in detail in relation to steps 281-293 of FIG. 2D. In step 281, an optical model of the microspore is created. The optical model of the microscope corresponds to the transfer function H computed in steps 257-269 described above. In step 283, the inverse optical model is calculated. Step 283 may be substantially similar to steps 271 and 273 described above. In general, the transfer function H is assumed to be orthogonal and the transpose $H^T$ of the transfer function H is therefore assumed to be equal to the inverse $H^{-1}$ of the transfer function H.

In turn, for each video image recorded in step 219, steps 285-293 are performed. In step 285, an initial estimate $V_0$ of the 3D volume being reconstructed is determined using the transpose of the transfer function H: $V_0=H^T I$ where I is a 2D image recorded in step 219. Steps 287-291 are then iteratively performed to improve the estimate V of the 3D volume being reconstructed. In step 287, a forward projection is determined: $I_{fp\_i}=H V_i$ where i corresponds to the number of the iteration of step 287-291 being performed (i initially is 0, and is incremented with each subsequent iteration). In step 289, a backward projection is determined: $V_{bp\_i}=H^T I_{fp\_i}$. Finally, in step 291, a correction factor is introduced prior to computing a next iteration: $V_{i+i}=V_i*corr$, where the correction factor con is computed based on the difference between $V_i$ and $V_{bp\_i}$ ($V_i-V_{bp\_i}$). Steps 287-291 are then repeated in order to iteratively reduce the error term $V_i-V_{bp\_i}$. In particular, the steps 287-291 can be repeated a fixed number of times (e.g., 8 iterations, i≤8). Alternatively, steps 287-291 can be repeated until the error term achieves a particular convergence criterion, and/or up to a maximum number of iterations. Following the completion of step 291 on the final iteration (e.g., when i=8 or when the convergence criterion is reached), the 3D volume being reconstructed is determined in step 293 based on reconstruction $V_i$ of the final completed iteration. Steps 285-293 are repeated for each video image that is recorded in step 219.

The light field 3D deconvolution of step 229 concludes once step 293 has been performed for each recorded video image. Upon completion of step 229, the light field 3D deconvolution provides an estimate of the reconstructed 3D volume for each image of the video recording of the sample volume, and the three dimensional video recording of the imaging target is thus obtained. In step 233, the 3D volume reconstruction can be plotted, for example on display 111. In one example, the recorded video of the imaging target is a recorded video of fluorescence in a living organism, and the plot of step 233 is a plot of fluorescence intensity of the points or regions of interest (ROI) within selected sample volume over time (e.g., a video of fluorescence intensity of the selected ROIs over time).

Because the reconstructed 3D volume information includes information on the sample target throughout the volume of the sample target and over time, the reconstructed 3D volume information can be used to provide a variety of different plots of the sample target. In various examples, 2D video plots of the sample target over time can be provided along 2D planes through the sample target. The 2D planes of the 2D video plots can be planes through the sample target that are parallel to the objective lens 105a, perpendicular to the objective lens 105a, or angled with respect to the objective lens 105a at any depth within the sample volume of the imaging target.

The method 200 can optionally include an additional step 231 performed after the completion of the 3D deconvolution of step 229. Step 231 includes performing independent component analysis (ICA), principal component analysis (PCA), or other statistic post-processing on the reconstructed 3D volume information. In particular, the statistic post-processing (e.g., ICA, PCA, or the like) is performed on patterns of changing intensity (e.g. corresponding to neuronal activity) in the 3D volume over time. The statistic post-processing thus considers information captured in different sequential images of the video recording of the reconstructed 3D volume. In one example in which the three dimensional video recording is of neural activity occurring in the sample volume, the performing of ICA as the statistic post-processing on the sequential images can identify individual neurons in the sample volume even when the neurons are smaller than (or have sizes on the same order of magnitude as) the resolution of the reconstruction. In particular, the ICA can be used to analyze firing patterns of the neurons in the sample volume, represented as fluorescent flashes in the sample volume, to identify individual flashes or pixels that correspond to same or different adjacent neurons. In particular, the ICA analyzes the patterns of flashes in the 3D reconstructed volume over time to determine whether flashes in adjacent pixels or adjacent locations in 3D space are synchronized over time (e.g., synchronized in time in different frames of the 3D video recording) and therefore are likely to correspond to a same neuron, or whether the flashes in adjacent pixels or adjacent locations in 3D space are unsynchronized and therefore correspond to different neurons. The ICA analysis rests on the precise timing information inherent in the synchronous capture of 3D volumetric information provided by the system 100 and method 200 that enables precise measurement and analysis of synchrony between individual pixels and/or locations in 3D space.

In one illustrative example, the system 100 shown and described in relation to FIG. 1 and the method 200 shown and described in relation to FIGS. 2A-2D are used to record in-vivo neural activity.

The system 100 and method 200 described above were successfully used to capture the dynamics in 3D of imaging targets over sample volumes extending from tens of micrometers (e.g., 10 um, 50 um, 100 um) to approximately 1 mm, with resolutions in the range of 1 um to 10 um laterally (along the x-y plane) and 1 um to 30 um axially (along the z-dimension). The resolutions were dependent on the size of the sample volume. The imaging was performed at speeds of up to approximately 100 Hz, although faster acquisitions could have been performed using faster camera sensors.

In some specific examples, the dynamics of spiking neurons were captured in volumes of approximately 700 µm×700 µm×200 µm at 20 Hz. Specifically, neural tissues expressing calcium sensors were imaged at volume rates of up to 50 Hz and at single-neuron resolution using the method described above. Effective resolutions were up to approximately 1.4 µm and 2.6 µm in the lateral (x-y plane) and axial (z-axis) dimensions, respectively, inside biological samples. The light-field deconvolution microscope (LFDM) system (e.g., system 100) included a microlens array placed at the image plane of an epifluorescence microscope, which captured different perspectives of the imaging target sample volume on the camera sensor. To overcome the trade-off between axial and lateral spatial resolution in LFM, aliasing of the recorded data was exploited and computational reconstruction methods based on 3D deconvolution were used to effectively obtain improved lateral and axial resolution.

To evaluate the spatial resolution of the system 100, subdiffraction-sized beads were imaged and the PSF for the system was reconstructed. Using a 40× objective, resolutions of approximately 1.4 µm and 2.6 µm were achieved in the lateral and axial dimensions, respectively. To verify the suitability of the LFDM for capturing the activity of individual neurons, a sample consisting of 6-µm-diameter fluorescent beads randomly distributed in three dimensions in agarose was imaged and the deconvolved light-field images were compared with a conventional focal stack (taken without microlenses).

Using the same objective with *C. elegans*, the majority of a worm (approximately 350 µm×350 µm×30 µm) was imaged while maintaining single-neuron resolution. As an example, a 3D volume reconstruction of a video recording of *C. elegans* can be obtained in which the fluorescence visible in the image is a result of whole-animal $Ca^{2+}$ imaging showing locations of neural activity in imaging target. The activity of neurons in the brain region surrounding the nerve ring and the ventral cord was thereby recorded at a 5-Hz volume rate. The LFDM method allowed for substantially higher volume rates, which were demonstrated by recording unrestrained worms at 50 Hz. Such volume rates would in principle be sufficient for performing whole-brain imaging in freely moving worms, especially if performed in combination with tracking of single neurons. However, as $Ca^{2+}$ signals in *C. elegans* typically occur at timescales of up to 1 Hz, the slower volume rate (5 Hz) was used in order to maximize the signal-to-noise ratio and reduce potential photobleaching.

The wide field of view (FOV) of the LFDM and the intrinsic simultaneity of the acquisition allow for the study of correlations in activity of neurons across the whole animal, on timescales which are not generally feasible with other unbiased $Ca^{2+}$-imaging techniques. In various experiments, correlated and anticorrelated activity patterns were observed between premotor interneurons in the head and motor neurons located along the ventral nerve cord of specimen imaging targets.

The imaging of smaller FOVs (approximately 200 µm×70 µm×30 µm) can be performed with faster volume reconstructions and better image quality. The system and method were used to resolve up to 74 individual neurons in a typical recording, around 30 of which showed pronounced activity over a recording time of 200 seconds.

The methods described herein can be used in a broad range of applications, including applications requiring high temporal resolution. For example, the methods can be used to capture dynamics of large populations of spiking neurons such as may be observed in live zebrafish larvae brains expressing the $Ca^{2+}$ indicator GCaMP5 pan-neuronally. By employing a 20× objective, whole-brain $Ca^{2+}$ imaging for volumes spanning approximately 700 µm×700 µm×200 µm was performed at a 20-Hz volume rate. Although optical single-cell resolution had to be compromised in favor of larger FOVs in some instances, the resolution was adequate to recover spatially resolved cellular signals over the entire time series using signal extraction and unmixing techniques. Specifically, neuronal activity was extracted for approximately 5,000 cells across the brain and fast $Ca^{2+}$ transients of the cells was followed on a millisecond timescale.

The high temporal resolution of the LFDM can be used to reveal subtle differences in the exact timing of the onset of the response for different groups of neurons located close to each other. Whereas the neurons in each group can exhibit a nearly synchronous onset of their activity, the collective response of each group can be delayed with respect to those of the other groups. Overall, the above methods and systems provide an imaging speed that is more than an order of magnitude faster than in previous whole-brain functional imaging, and that thus is capable of reliably capturing the dynamic activity of a large number of cells with high spatial and temporal resolution.

As such, the LFDM methods and systems described herein can be used to capture the neuronal activity of the entire nervous system of *C. elegans* simultaneously at single-cell resolution as well as record dynamics of spiking neurons by performing whole-brain $Ca^{2+}$ imaging in larval zebrafish at 20 Hz. The increase in spatial resolution compared to that of LFM can be achieved by performing deconvolution during postprocessing. The simultaneity of acquisition of volumes in LFDM imaging eliminates spatiotemporal ambiguity associated with sequentially recorded approaches and decouples temporal resolution from volume size. Resolutions in all three dimensions can be set by the objective and microlens properties, and FOV and acquisition rate can be determined by the camera chip size, frame rates, and signal intensity. The LFDM is easy to set up and is cost effective and compatible with standard microscopes. Both the temporal resolution and the obtainable FOVs make light-field deconvolution microscopy an attractive technique for future combination with behavioral studies in biological and neuroscience research.

As noted above, the processing system 109 is used to determine the light field PSF and the transfer function H, and to perform the light field 3D deconvolution. For these purposes, the processing system 109 is configured to efficiently compute large numbers of 2-dimensional convolutions as part of performing the 3D volume reconstruction. The 3D reconstruction speed depends heavily on the implementation of the convolution operation and its speed. The reconstruction can be accelerated according to the convolution theorem by computing on graphical processor units (GPUs) in the Fourier domain. The underlying fast Fourier Transform (FFT) can be computed in $O(n \log(n))$ operations as compared to conventional convolution which can require $O(n!)$ operations. Furthermore, the FFT is well suited for GPU computing, and was found to result in significant (up to 20×) reduction in computing time compared to use of a 12-core CPU based execution. With a GPU computing method, reconstructing individual frames of recorded image sequences may take between 2 minutes and 6 minutes, depending on the size of the image. For example, the reconstruction of only the head ganglia region of *C. elegans* may be completed in about 2 minutes where the reconstruction of the whole *C. elegans* may take about 6 minutes with 8 iterations of the deconvolution algorithm (i=8 in steps 287-291). Similar reconstruction times were measured for zebrafish volume reconstructions.

In comparison, in another example, CPU based computing on 12 parallel cores may require between 5 minutes and 30 minutes. However, by parallelizing the reconstruction on a medium sized cluster employing of around 40 nodes, a typical 1000 frame movie of whole *C. elegans* may be reconstructed within approximately 12 hours. Cloud based computing options, e.g. using online web services and online tools, could also be used to provide efficient means for large-scale volume reconstruction.

Reconstruction times of image sequences could be further optimized by using the 3D reconstructed volume of one recorded 2D frame as the initial guess for reconstruction a 3D volume of the next recorded 2D frame in the video recording. Such a reconstruction method (based on reconstructions of previous frames of the 2D video recording) could remove the need for multiple algorithmic iterations at each frame. Further, in examples in which the imaging speed is faster than the speed of observed phenomena (e.g., when imaging speed are sufficiently faster than both neuronal activity and movement of the worm), such a reconstruction method could be especially efficient.

Typically, the imaging target (e.g., a sample mounted in mount 101) being imaged by the three-dimensional video imaging as detailed above is formed of a light scattering medium. For example, a sample of biological tissue is formed of light scattering medium. As a result, light (and light rays) travelling through the imaging target—including light and light rays that will ultimately be detected by the camera 103 once they emerge from the imaging target—is scattered by the medium prior to reaching the CMOS sensor. The light reaching the CMOS sensor may therefore not accurately reflect the structure of the imaging target because of errors (e.g., noise) introduced by the scattering of the light in the imaging target.

In order to improve the resolution of the three-dimensional video image, the effects of light scattering may be accounted for in the process used for forming three dimensional video recordings of imaging targets using light field microscopy (e.g., the process described in steps 201-233, above). In particular, the effects of light scattering may be accounted for by establishing a detailed model of the light scattering as a source of noise in the captured image, and by using the detailed model of light scattering to determine a revised light field point spread function (PSF) that takes into account the scattering. The flow diagrams of FIGS. 3A and 3B and the plots of FIGS. 3C and 3D provide a detailed explanation of the functioning of a light field microscope (e.g., microscope system 100) that takes into account light scattering in the imaging target to improve imaging resolution.

Figure 3A:
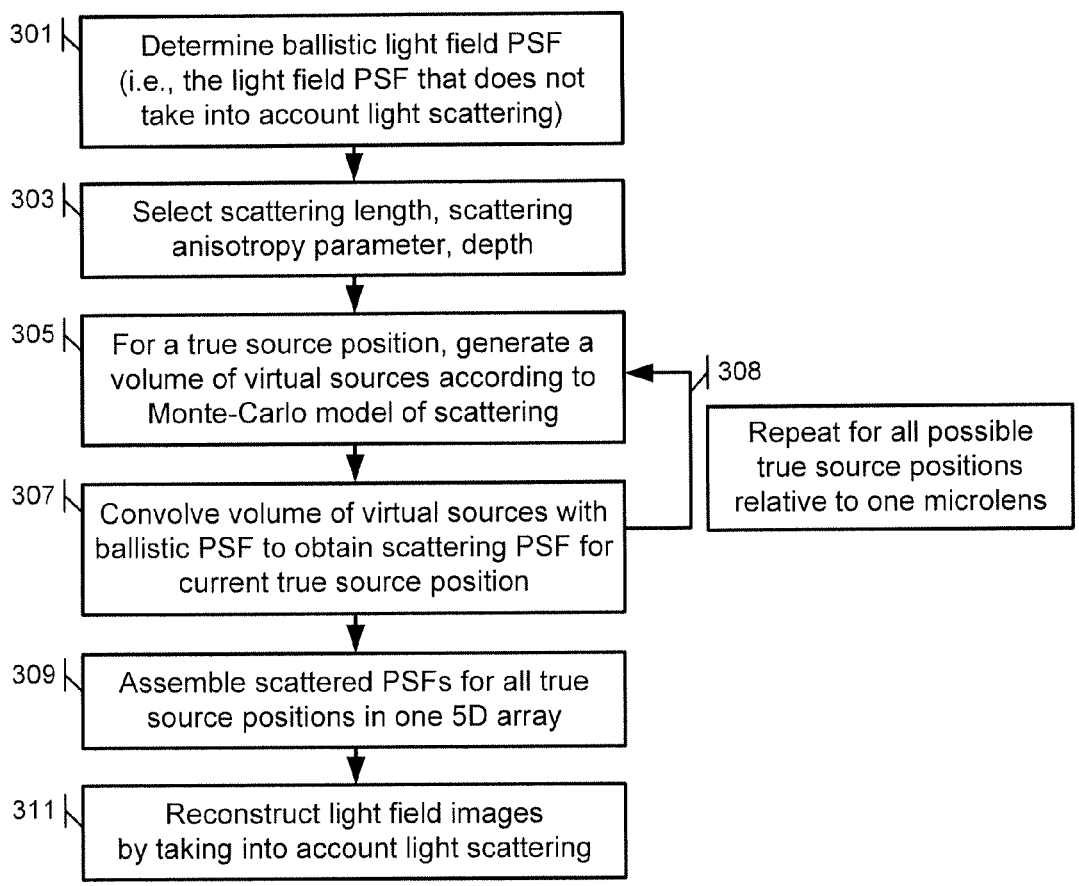
Figure 3C:
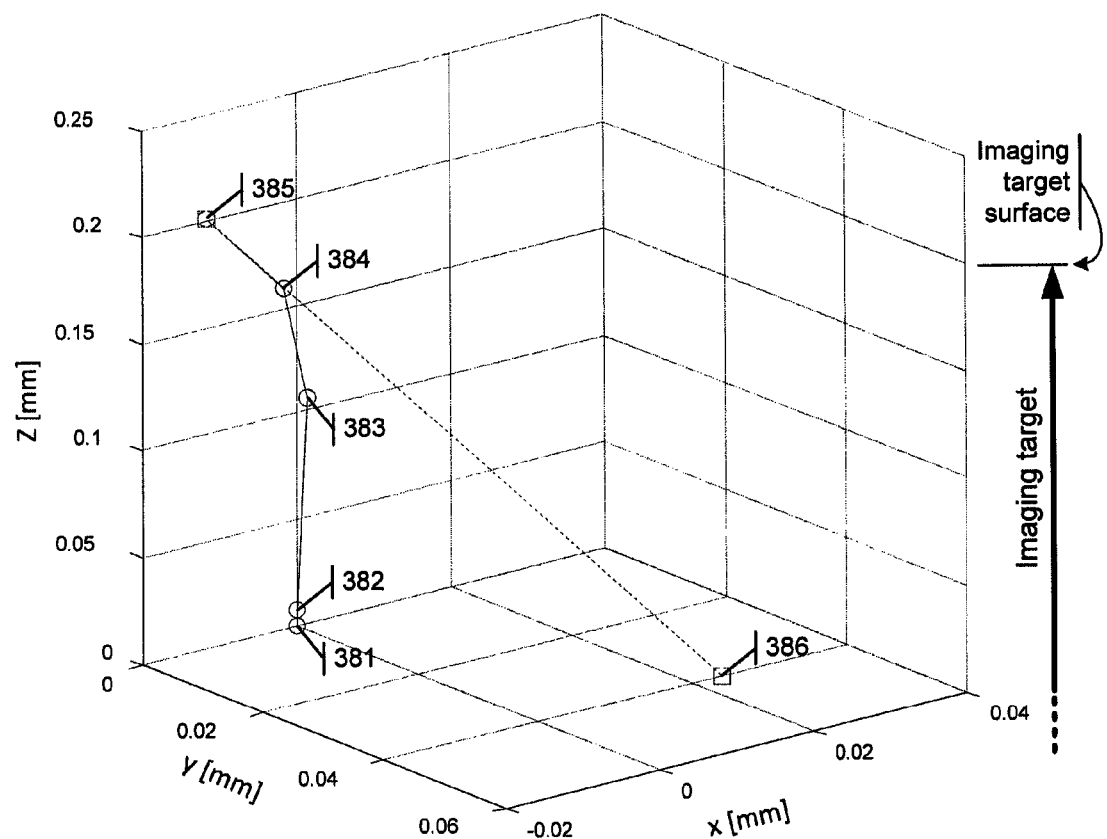
FIGS. 3C and 3D are plots illustrating steps of the methods used for modeling light scattering within the imaging target.
Figure 3D:
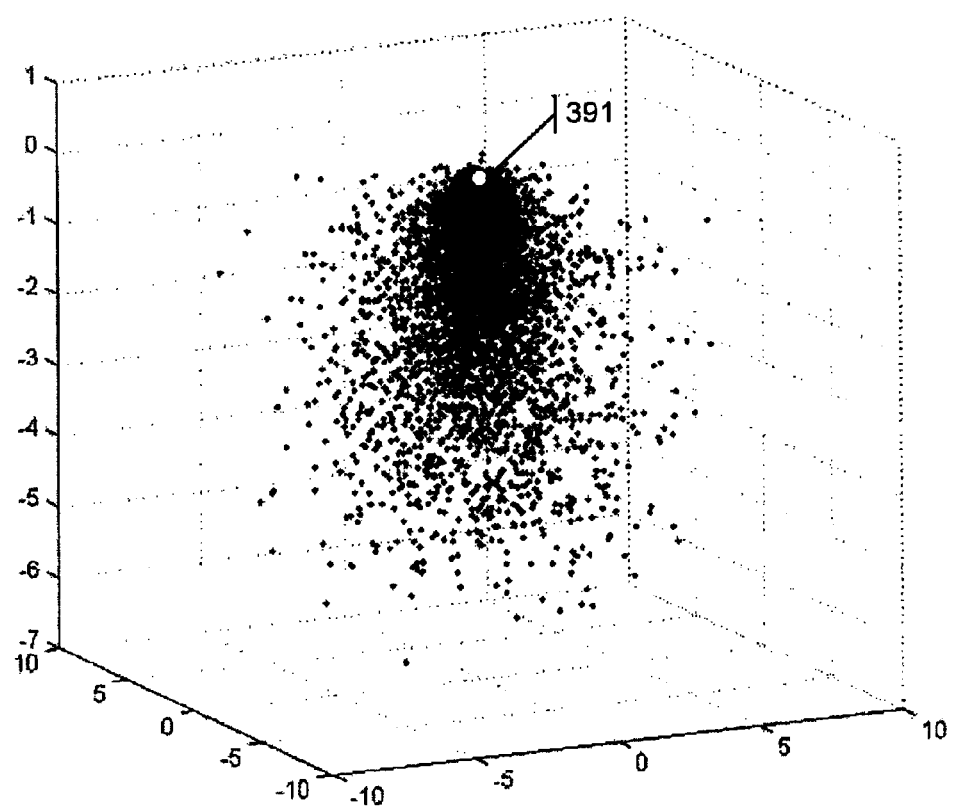

The flow diagram of FIG. 3A details a method 300 processing performed as part of modelling the light scattering occurring in the imaging target. The method 300 begins in step 301 with a step for determining a light field PSF that does not take into account light scattering. This light field PSF, referenced as the "ballistic" light field PSF, may be determined using the process described above in step 225 (and detailed in relation to steps 251-273 of FIG. 2C). Specifically, determining the light field PSF may include mounting the array of microlenses 107 between a microscope tube lens 105*b* and an image sensor 103, and determining the light field PSF based on measured calibration parameters of the array of microlenses 107 and of the light field microscope system 100.

In turn, the effects of light scattering are modeled through steps 303-311. The modelling is used to determine characteristics of light scattered in the imaging target and reaching the array of microlenses. In particular, in step 303, light scattering modelling parameters are selected—including parameters such as scattering length, scattering anisotropy, and scattering depth. These parameters are used to characterize the light scattering that occurs in the imaging target (e.g., a sample mounted in mount 101), and the parameters are typically different for different tissue types so as to reflect differences in light scattering occurring in different tissues. In general, the parameters can be selected based on the type of tissue (i.e., the medium) forming the imaging target. Alternatively, the light scattering parameters can be measured in the particular imaging target to be imaged, or the parameters can be measured in a sample of a similar tissue or tissue type.

Once the light scattering modelling parameters are selected, the parameters are used to model the effects of light scattering in the imaging target. For this purpose, the effects of light scattering are determined for light rays emanating from different locations within the imaging target—and in particular, for light rays emanating from a plurality of selected "true source" positions serving as sample points within the imaging target. In general, the modelling relies on determining the effects of light scattering for "true source" positions located throughout the imaging volume (i.e., the volume of the imaging target that will be imaged using light field microscopy). In one example, "true source" positions are selected throughout the range of one lens of the microlens array 107.

In the example, an array or grid of "true source" sample positions are selected in the imaging volume to include a grid of 10 sample points along each of the x and y axes in an x-y plane parallel to the microlens array 107 (for a total of 100 sample points in each x-y plane), with the sampling repeated at each of 50 different depths along a z-axis orthogonal to the microlens array 107 (resulting in 10*10*50=5,000 sample source positions being computed for the one lens of the microlens array). Different numbers of sample points along the x, y, and z axes may alternatively be used.

For each of the selected "true source" positions, steps 305 and 307 are repeated. Specifically, in step 305, a Monte-Carlo simulation is used to determine the behavior of rays emanating from a first true source position. Specifically, for a first ray emanating from the first "true source" position, the behavior of the ray is modeled to determine (i) whether the ray will emanate from the imaging target surface of the imaging target towards the objective lens 105 and microlens array 107 of the light field microscope, and (ii) if so, determine the characteristics of the scattered light (e.g., the direction, angle, and/or intensity of the scattered light). In turn, for those rays that emanate from the imaging target surface, the model determines the location of an equivalent source that would give rise to a ray with the same characteristics (i.e., a ray emanating from the imaging target with the same angle and intensity) if scattering were not occurring. The equivalent source is termed a "virtual" source. The simulation is repeated for a large number of rays (e.g., 100,000 rays) in step 305, and a set of equivalent virtual sources (e.g., <100,000 sources) is determined.

In step 307, the volume of the virtual sources determined in step 305 is convolved with the ballistic light field PSF to obtain the scattering PSF for the current true source position in step 307. In this regard, the scattering PSF represents the 2D image that would be captured by the camera 103 as a result of light scattering in the imaging target and propagating through the lenses 105 and microlens array 107 of the light field microscope system 100. As such, the scattering light field PSF characterizes the propagation of a wavefront from a point source located within the light scattering medium of the imaging target through the array of microlenses 107 to the image sensor 103.

As shown at step 308, steps 305 and 307 are repeated for all of the "true source" positions selected throughout the imaging volume. In our example including 5,000 true source positions, steps 305 and 307 are repeated 5,000 times to obtain 5,000 scattering PSFs. In particular, step 308 includes repeating the processing for all possible true source positions relative to one microlens, and for all relative depths of the imaging target.

Once steps 305-308 have been completed, all of the scattering PSFs obtained in step 307 (i.e., obtained in repeated instances of step 307 for all "true source" positions) are assembled together in one five dimensional (5D) array to obtain the scattering light field PSF that takes into account scattering (step 309). Finally, in step 311, the scattering light field PSF of step 309 is used as the PSF to perform light field 3-dimensinal deconvolution (e.g., in accordance with step 229 of method 200) to obtain the light-field video image with an enhanced imaging resolution. Specifically, the scattering light field PSF is used to produce 3D volumetric information of the imaging target from a 2-dimensional (2D) recording of the imaging target obtained by the image sensor 103. In particular, the scattering light field PSF is used to determine a transfer function characterizing a propagation of wavefronts from sample points throughout a sample volume of the imaging target through the light scattering medium of the imaging target and the microlens array to the image sensor, and the transfer function is in turned to perform a light field 3-dimensional (3D) deconvolution on the recorded 2D recording of the imaging target to produce the 3D volumetric information of the imaging target from the recording.

Step 305 has been described as using a Monte-Carlo simulation to determine the behavior of rays emanating from each of the selected true source position. More generally, other types of models and simulations of scattering can be used. Further, a detailed implementation of a Monte-Carlo simulation of scattering is described below in relation to FIGS. 3B and 3C.

The flow diagram of FIG. 3B details steps involved in generating a volume of virtual sources according to a Monte-Carlo model of scattering. The flow diagram is described in concert with FIG. 3C, which shows a plot of one illustrative simulated ray undergoing scattering in the imaging target. The Monte-Carlo simulation begins in step 351 with the selection of a number n of rays to simulate (n, positive integer >0). Any number of light rays can be selected, and in one illustrative example 100,000 rays are selected to be simulated in step 351. Steps 353-363 are then repeated for each of the n rays to be simulated. Steps 353-363 are used to model the behavior of each of the n rays as they propagate through the imaging target and scatter in the imaging target.

In step 353, a model ray is launched from the true source position selected for the simulation (e.g., the true source position selected in step 305). For example, the ray can be launched from the "true source" position 381 shown in FIG. 3C. The launched ray travels in a random direction and for a random distance.

Steps 355-359 are used to determine the direction in which the ray is launched and travels, and the distance for which the ray travels before scattering. Specifically, in step 355, a distance after which the model ray scatters is determined. For example, a sample is drawn from an exponential distribution characterized by the scattering length to determine the distance after which scattering occurs. In step 357, a scattering angle of the scattering is determined. For example, a sample is drawn from the Henyey-Greenstein distribution characterized by the anisotropy parameter to determine a polar scattering angle. Finally, in step 359, an azimuth scattering angle is determined. For example, a sample is drawn from a uniform distribution [0, $2\pi$] to determine an azimuth scattering angle.

In step 361, the current ray is propagated in the direction and for the distance determined based on the samples drawn in steps 355-359. A new ray position (e.g., position 382 in FIG. 3C) is determined based on the propagation direction and distance, and a new scattering event is modeled at the new ray position by repeating steps 355-359 at the new ray position. Specifically, as shown at step 362, the ray is modeled to repeatedly propagate and scatter according to the samples determined in steps 355-359 (as shown at positions 382, 383, 384 of FIG. 3C) until the ray reaches the surface of the imaging target sample (at position 385), or until the ray leaves the source volume through a side or bottom face.

If the ray leaves the source volume through a side or bottom face in step 362, the ray is not used for computation of scattering and control passes to step 353 for a next ray to be launched.

If the ray reaches the sample surface (step 363), an equivalent or virtual source is determined that can model the scattering ray. Specifically, a position is determined of a virtual source that would give rise to a ray having the same characteristics as the modeled ray (i.e., having the characteristics, including angle and intensity, of the ray reaching the sample surface in step 363) in an imaging target in which no scattering occurs. The position of the virtual source can be determined by mirroring the surface crossing position of the modeled ray with respect to true source position. The virtual source is then located at the determined position (position 386 of FIG. 3C).

As shown at step 364, steps 353-363 are repeated until the selected number n of rays to simulate (as selected in step 351) has been reached. Once the selected number of rays has been reached, the virtual source strength is determined in step 365. Specifically, the virtual source strength is determined by the true source strength divided by the number of rays to simulate, divided by the total fraction of ballistic-to-scattered intensity at this depth and scattering length.

FIGS. 3C and 3D illustratively show the steps involved in implementing the Monte-Carlo model of scattering detailed in steps 351-365. FIG. 3C shows an illustrative light ray that may result from one iteration of the simulation described in relation to FIG. 3B and steps 353-363. In the illustrative example of FIG. 3C, the ray is launched from the true source position 381 selected to be within the imaging target. In the example, the imaging target has an imaging target surface at z=0.2 and extends in the volume below the z=0.2 plane. Further, the microlens array is disposed at a location z >0.2, such as for example a location of z=0.25.

In accordance with the particular simulation instance shown in FIG. 3C, the ray launched from true source position 381 propagates from position 381 to position 382 according to the distance and angles determined in a first iteration of steps 355-359. A scattering event occurs at position 382, causing the ray to propagate from position 382 to position 383 according to the distance and angles determined in a second iteration of steps 355-359. Similarly, the ray scatters and propagates to position 384, and from there to position 385 where the ray reaches the surface of the imaging target (e.g., in step 363). Once it is determined that the ray has reached the sample surface at position 385, the location of an equivalent virtual source (without scattering) is determined as position 386. The position 386 is determined such that the lines [384-385] and [385-386] are co-linear, such that position 386 is located on the sample side of the sample surface, and such that the distance [385-386] has a length equal to the sum of lengths of the segments [381-382], [382-383], . . . , and [384-385]. Once the position 386 is determined, the light scattering of the simulated ray can be modeled using an ideal scattering-free source positioned at location 386.

As described in relation to FIG. 3B, the simulation is repeated for a number n of rays (e.g., 100,000 rays). FIG. 3D is a volumetric plot in which each point corresponds to the location of one equivalent virtual source (a "phantom source") determined at step 363 in one iteration of the simulation. Further, the white dot 391 shows the position of the true source used in the simulation to obtain the locations of all of the virtual sources shown in the plot.

The modelling of light scattering presents one way of enhancing the imaging resolution of three-dimensional video using light field microscopy. An alternative or additional approach to enhancing imaging resolution (which can be used separately from, or in combination with, the light scattering modelling approach) is presented in relation to FIGS. 4A-4C. In accordance with the approach of FIGS. 4A-4C, a second imaging modality is used to obtain prior knowledge of the structures being imaged by the light field microscope. In one example, the second imaging modality is a static imaging modality that produces static (e.g., non-video) images, and the second imaging modality has a higher spatial resolution than the light field microscope. For example, two-photon (2P) imaging, multi-photon imaging, or confocal excitation imaging can be used as the second imaging modality.

In examples in which the light field microscopy is used to image the time dynamics of neural activity in three dimensions, the second imaging modality can be used to determine the locations of individual neurons. The location information provided by the second imaging modality is used during deconvolution of the light field information to improve the accuracy of the reconstruction based on the known positions of neurons. Specifically, the known positions of neurons correspond to positions at which activity (e.g., Calcium fluorescence) is expected to take place, and the position information can therefore be used to obtain time-series signals of activity at those locations.

Figure 4A:
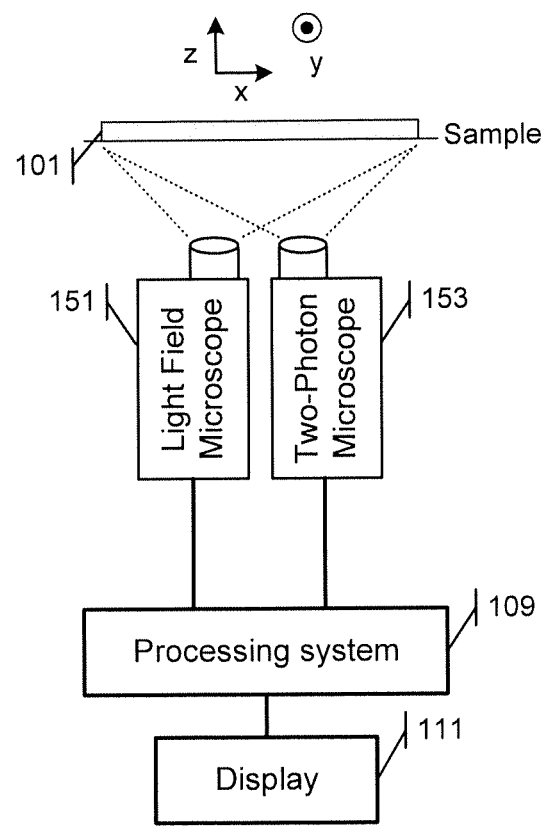
FIG. 4A is a high-level functional block diagram of a system for performing high resolution 3D video imaging using light field microscopy in combination with a second 3D imaging modality.
Figure 4B:
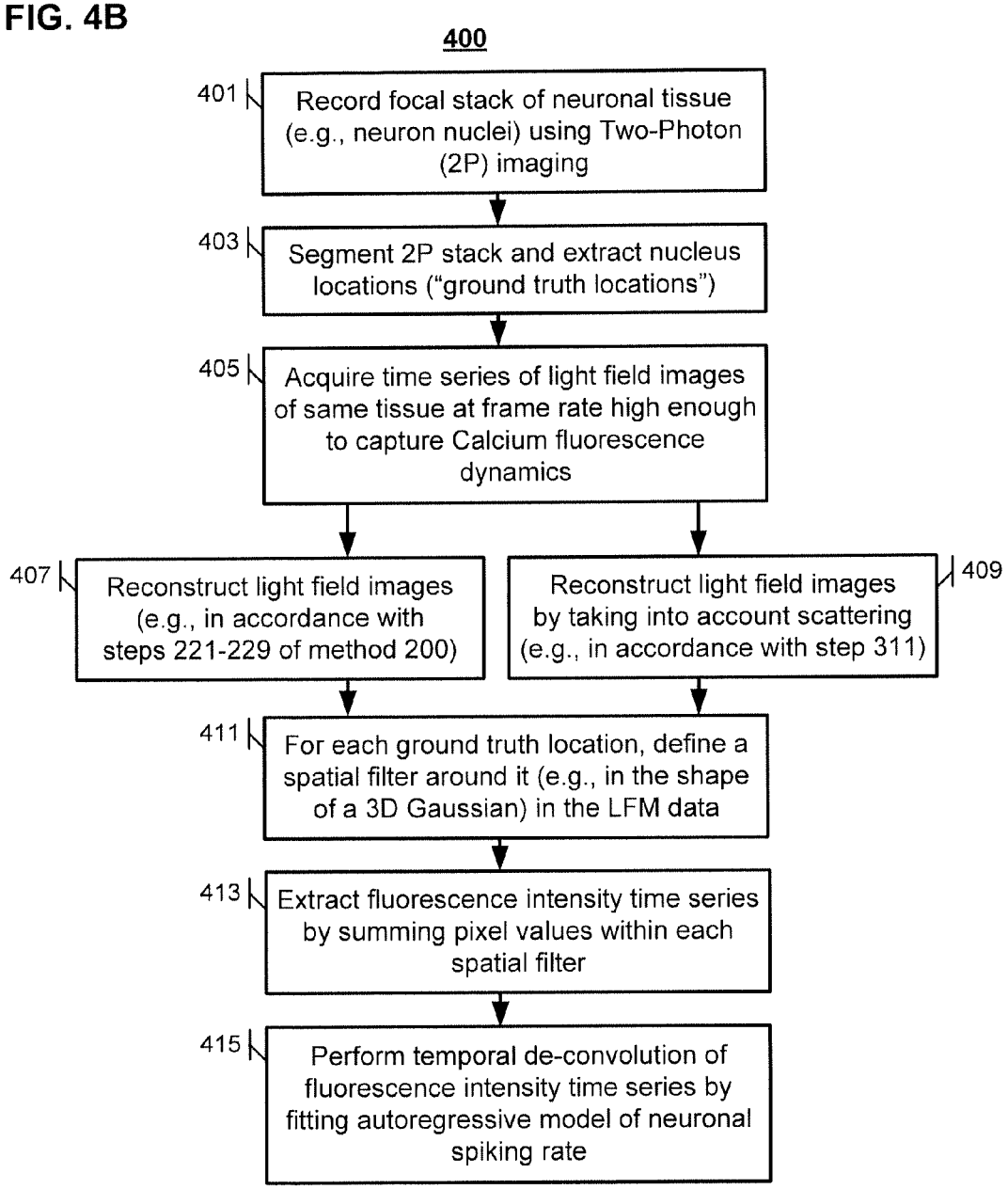
FIGS. 4B and 4C are high-level flow diagrams of a method for forming 3D video recordings using light field microscopy in combination with a second 3D imaging modality.

In this manner, the method 400 of FIG. 4B can implemented using a modified light field microscopy system 150 shown in FIG. 4A. In the modified system 150, a light field microscope 151 is used that is substantially similar to that shown in FIG. 1 and includes a camera 103, lenses 105, and a microlens array 107. Additionally, a second imaging microscope such as a two-photon microscope 153 (or a multi-photon or confocal microscope) is used to obtain three dimensional images of the sample mounted in mount 101. Both the light field microscope 151 and second imaging microscope 153 are communicatively connected to the processing system 109 and display 111 used for extracting and displaying the 3D volumetric video information of the imaging target. As shown, the light field microscope 151 and second imaging microscope 153 are positioned to both view the mount 101 and imaging target sample. While the light field microscope 151 and second imaging microscope 153 are shown as having separate lenses and optics in FIG. 4A, the light field microscope 151 and second imaging microscope 153 may share at last some of the lenses 105 used to image the target sample.

In method 400, the imaging target is imaged using the second imaging modality in step 401. As noted above, the second imaging modality is an imaging modality other than light field microscopy, such as 2P imaging, multi-photon imaging, or confocal excitation imaging. The second imaging modality is used to image the entire imaging volume of the imaging target to obtain three-dimensional image information of the imaging target. In the case of neuronal tissue, the second imaging modality is used to record the focal stack of neural tissue at a resolution sufficient to locate cell bodies (e.g., soma), and the modality may use fluorescent protein to label neuron nuclei in the sample. The second imaging modality could be used to record the focal stack at a higher resolution, for example to identify and locate individual dendrites. In step 403, the three-dimensional image obtained using the second imaging modality is segmented to identify the individual cell bodies and extract position information on the individual cell bodies. In one example, the segmentation and extraction enables the coordinates of centers (e.g., center of mass) of cell bodies to be identified in three dimensions; in other examples, the segmentation and extraction additionally enables a radius of the cell or neuron body to be estimated and for the radius to be extracted. The extracted locations are referred to as "ground truth locations" and are locations at which fluorescence activity is expected to take place in the three-dimensional video images captured using light field microscopy.

Once steps 401 and 403 are completed, the imaging target is imaged using light field microscopy to obtain three-dimensional video images of the target. Specifically, in step 405, a time series of light field images of the imaging target tissue is acquired (in a manner similar to that described in relation to step 219 of method 200). In general, the time series images are captured at a frame rate high enough to capture calcium $Ca^{2+}$ fluorescence dynamics in the imaging target tissue. Note as part of performing step 405 (or prior to performing step 405), steps 201-217 of method 200 may also be performed if necessary in order to calibrate the light field microscope 151.

In step 407, the light field images are used to recover 3D volume data as detailed in steps 221-229 of method 200. Alternatively, in step 409, the light field images are used to recover 3D volume data while taking into account light scattering, in accordance with the methods discussed in relation to step 311 of FIG. 3A above. The recovering of the 3D volume data may include performing a light field 3-dimensional (3D) deconvolution on a 2D recording of the imaging target to produce 3D volumetric information of the imaging target.

In turn, post-processing of the recovered 3D volume data is performed in steps 411-415 to improve the resolution of the imaging. First, in step 411, a spatial filter is defined around each ground truth location—corresponding to the center of each cell body as determined in step 403 using the second imaging modality. In one example, the spatial filter is a filter having a 3D Gaussian characteristic; in other examples, various other filters can alternatively be used. In step 413, fluorescence intensity time series are extracted for each ground truth location by performing, for each time sample and at each ground truth location, a weighted sum of intensity values in the 3D volume data using weights provided by the spatial filter. In this manner, the spatial filter enables the fluorescence intensity time series to take into account the intensity values at the ground truth location and at locations proximate to the ground truth location (with the various intensity values being weighted according to the selected filter).

In one example, step 413 is performed by convolving a matrix of ground truth locations with a 3D Gaussian distribution of a size similar to a neuron diameter, and using the resulting matrix as a starting location estimate for deconvolution.

Finally, in step 415, temporal de-convolution is performed on the fluorescence intensity time series data based on a model of the time dynamics of neuronal activity. The temporal de-convolution is performed separately on the fluorescence inventory time series extracted at each ground truth location. The temporal deconvolution is used to determine whether the fluorescence intensity time series results from the activity of two or more neurons that are located proximate to each other, and to distinguish between the activity in each of the neurons (in situation in which two or more proximate neurons are identified). In particular, an autoregressive model of neuronal spiking rates can be fit to the time series data and used to identify individual neuron activity in cases in which the neural activity of multiple neurons in overlapped.

Figure 4C:
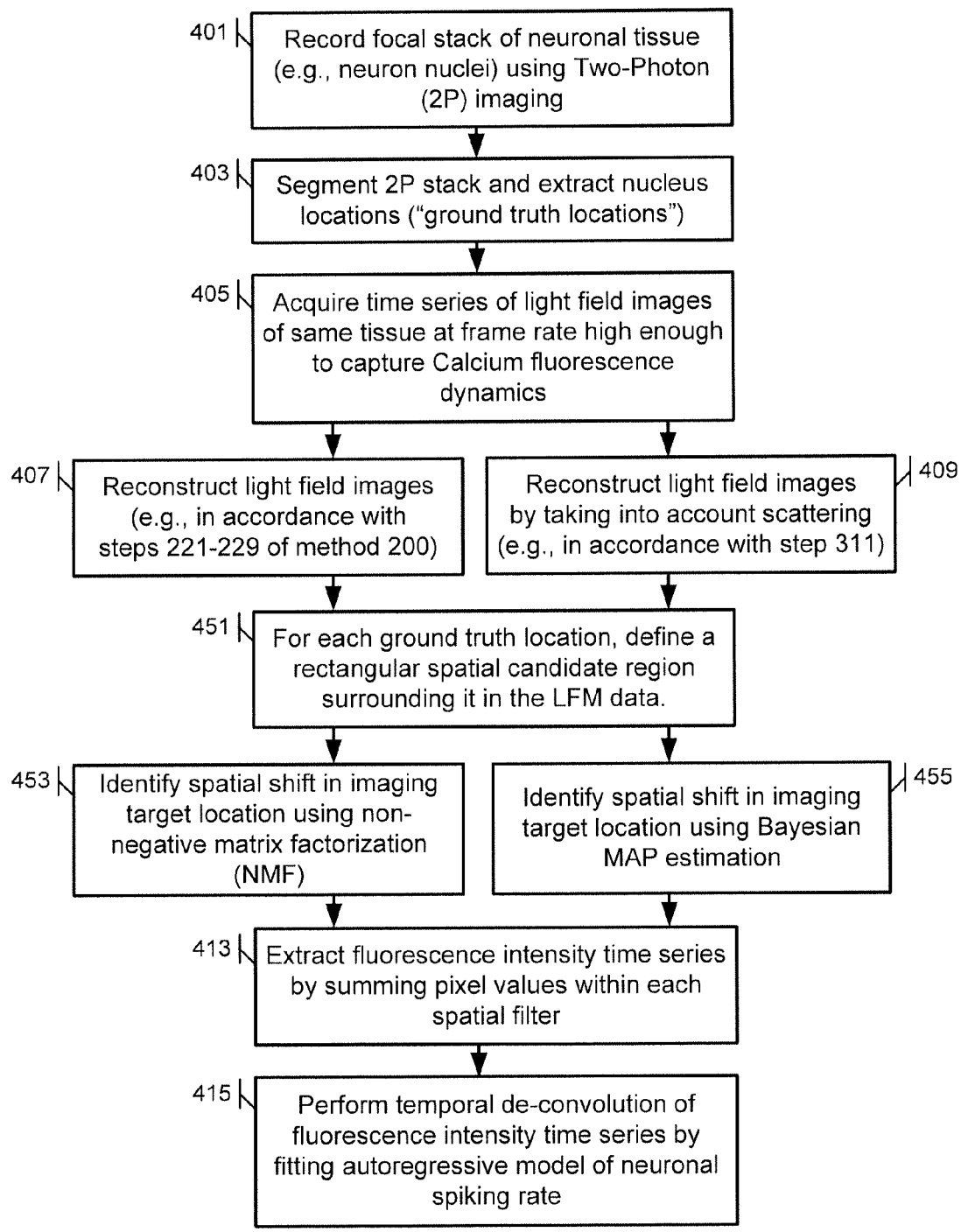

In order to further leverage the information gained from the second imaging modality used in method 400, the method 450 illustrated in FIG. 4C can be used. Method 450 begins with the same steps 401-409 as method 400. However, while the ground truth locations are assumed to have fixed and known locations (as determined in steps 401-403) in method 400, method 450 accounts for possible changes or movements in the positions of the ground truth locations. Such changes or movements may result from a static offset between the positional references used by the light field microscope 151 and the second imaging modality 153. More generally, the changes or movements may result in movements in the imaging target sample (such as movements of an organism or tissue being imaged).

To account such changes or movements, steps 451-453 are introduced in method 450 to identify any spatial shifts in the position of the imaging target. In step 451, a spatial candidate region surrounding each ground truth location is defined. Each spatial candidate region is a region surrounding a corresponding ground truth location and representing the volume within which the ground truth location is expected to reside. In some examples, the spatial candidate region may be cubic, spherical, ovoid, or any other appropriate shape. The size (volume) of the spatial candidate region may vary based on the expected magnitude of movement of the imaging target; specifically, the spatial candidate region may be small in situations in which the ground truth location is believed not to have moved by much, and may be larger in situations in which the ground truth location is expected to have moved a larger distance. The spatial candidate region is generally symmetric around the ground truth location, but is not necessarily symmetric.

In steps 453 and 455, neuron location estimates are found that minimize a difference between a convolution of neuron location estimates with the light field PSF (or scattering light field PSF) and the observed data. The minimization is performed, for example to penalize an L1-norm of neuron location estimates to enforce sparsity.

In detail, in step 453, non-negative matrix factorization (NMF) is used on the candidate regions to refine spatial filters of the neuron locations. Specifically, NMF is used to identify the locations within the spatial candidate regions at which the neuron bodies are most likely to reside. The identification performed by NMF takes into account both the time dynamics and the ground truth locations to identify the location (e.g., the voxel) on which to center the ground truth location to obtain the best time series data from the spatial filters. For example, a matrix of candidate region voxels times temporal activity can be used as input data to NMF. Using NMF, adjusted ground truth locations are determined. Once the NMF is completed, steps 413 and 415 are performed using the adjusted ground truth locations determined in step 453.

Instead of step 453, step 455 may be implemented. In step 455, a Bayesian maximum a posteriori (MAP) probability estimate is used to determine the location of the ground truth locations. In accordance with this method, the prior distribution is taken to be a 3D Gaussian that is centered on the ground truth locations determined using the second imaging modality (e.g., 2P imaging of steps 451-453). The likelihood function is a 3D Gaussian that is scaled to empirical movement magnitudes in the x, y, and z directions. The Bayesian MAP estimate is obtained using Markov-Chain Monte-Carlo sampling. Based on the outcome of the Bayesian MAP procedure, adjusted ground truth locations are determined. Once step 455 is completed, steps 413 and 415 are performed using the adjusted ground truth locations determined in step 455.

As described in relation to FIG. 4B, the use of two different imaging modalities enables the light field microscope to be used to extract more accurate and higher resolution time series data in steps 413 and 415. Additionally, as detailed in accordance with steps 409 and method 300, the resolution can further be improved by accounting for noise resulting from scattering of light within the imaging target. Furthermore, as detailed in steps 453 and 455, the extraction can further be improved by accounting for movement in the imaging target using NMF, Bayesian MAP estimation, or other appropriate optimization approaches. In one example, methods for minimizing the L1 norm (Manhattan norm) are used as part of or instead of these NMF and Bayesian MAP estimation approaches in method 450.

Figure 5:
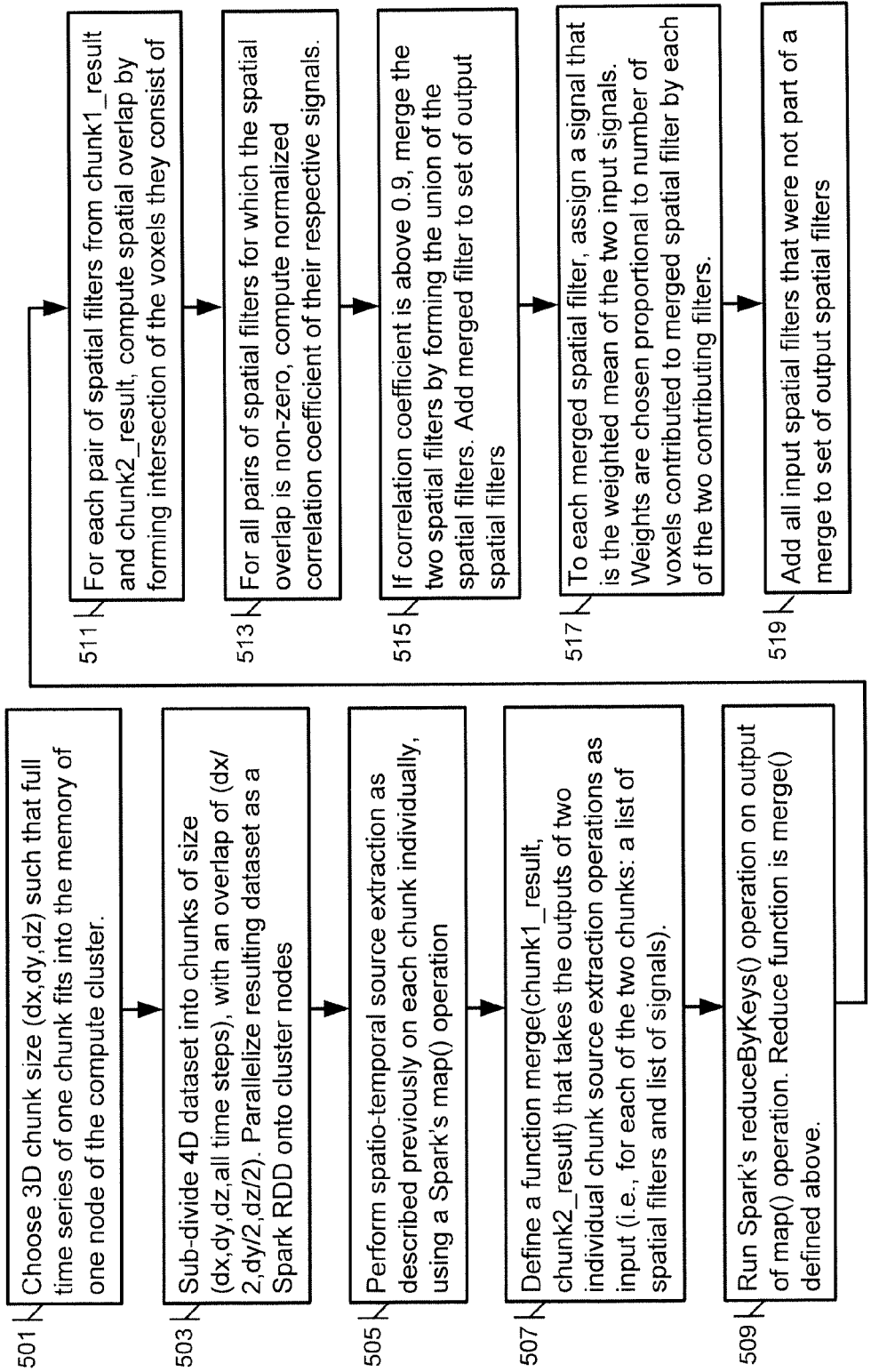
FIG. 5 is high-level flow diagrams of a method for performing spatio-temporal source extraction on a parallelized processing system.

The processing performed by processing system 109 in order to implement methods 200, 300, 350, 400, and 450 requires large amounts of processing power. In order for the processing to be performed more efficiently, the processing can be performed in parallel on multiple processors and/or multiple computers. The flow chart of FIG. 5 details a method 500 for parallelizing the four dimensional spatio-temporal source extraction performed by system 109 by chunking and/or merging the computational load. The method 500 can be implement in Apache Spark.

In accordance with method 500, a size of 3D chunks is determined in step 501. The 3D chunk size (dx,dy,dz) is selected such that the full time-series of one chunk of the data fits into the memory of one node of the compute cluster. The data includes the data recorded in step 219 of method 200 and that will be subject to 3D deconvolution in step 229. In step 503, the 4D dataset (including 3 spatial dimensions x, y, z, and the time dimension t) is subdivided into chunks of the selected size (dx,dy,dz, all time steps), with an overlap of size (dx/2,dy/2,dz/2) between adjacent chunks. The resulting dataset is parallelized as a Spark resilient distributed dataset (RDD) onto cluster nodes for processing. In step 505, the spatio-temporal source extraction is performed (e.g., as described in relation to step 229) on each chunk individually, using a Spark's map( ) operation.

In turn, in step 507, a function merge(chunk1_result, chunk2_result) is defined that takes the outputs of two individual chunk source extraction operations as input (i.e., for each of the two chunks: a list of spatial filters and list of signals). In step 509, Spark's operation reduceByKeys( ) is executed on the output of map( ) operation (from step 605). The reduce function is the merge( ) function defined above. Then, for each pair of spatial filters from chunk1_result and chunk2_result, a spatial overlap is computed in step 511 by forming intersection of the voxels they consist of. In step 513, for all pairs of spatial filters for which the spatial overlap is non-zero, a normalized correlation coefficient of their respective signals is computed. If the correlation coefficient is above 0.9, the two spatial filters are merged in step 515 by forming the union of the spatial filters. The merged filter is added to a set of output spatial filters. Further, a signal that is the weighted mean of the two input signals is assigned to each merged spatial filter in step 517. The weights are chosen to be proportional to the number of voxels contributed to the merged spatial filter by each of the two contributing filters. Finally, in step 519, all input spatial filters that were not part of a merge are added to the set of output spatial filters.

As known in the data processing and communications arts, a general-purpose processing system 109 typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the forming of three dimensional video recordings of imaging targets using light field microscopy. The software code is executable by the general-purpose processing system 109. In operation, the code is stored within the general-purpose computer platform. At other times, however, the software may be stored at other locations and/or transported for loading into the appropriate general-purpose computer system. Execution of such code by a processor of the processing system platform allows the platform to implement the methodology for forming 3D video recordings of imaging targets using light field microscopy in essentially the manner performed in the implementations discussed and illustrated herein.

Figure 6:
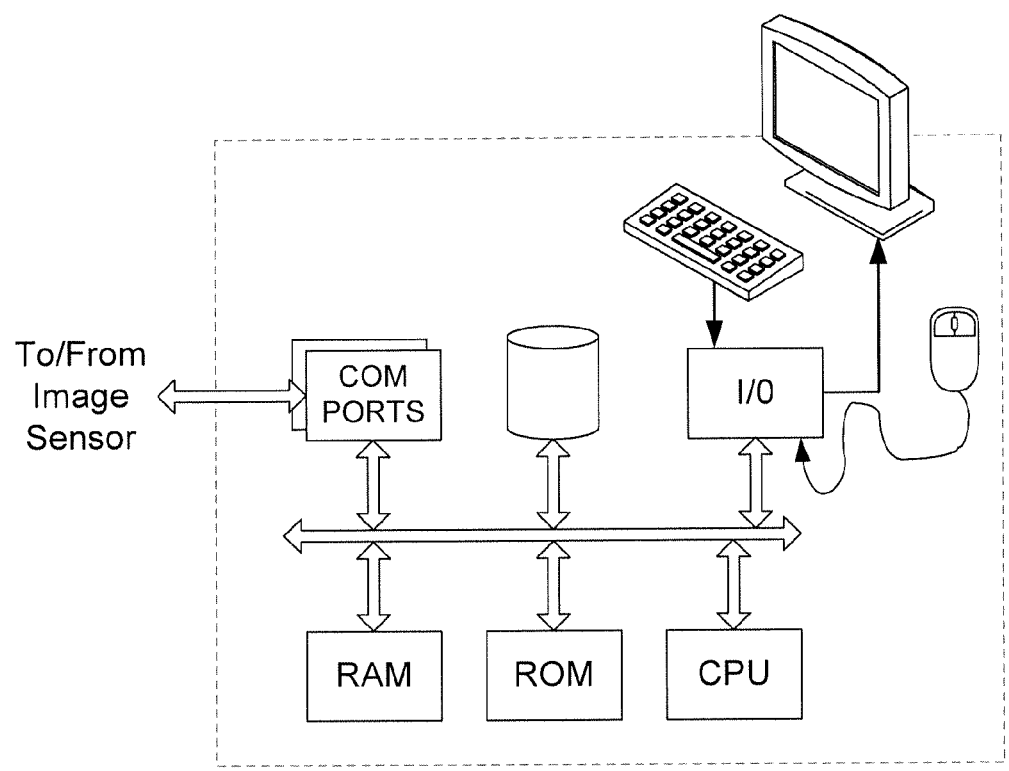
FIG. 6 is a functional block diagram illustration of a general purpose processing system platform such as may be used in the systems of FIGS. 1 and 4A.

FIG. 6 is a functional block diagram illustration of a general purpose processing system platform 109. Specifically, the figure depicts a computer with user interface elements, as may be used to implement a processing system 109. The processing system includes a data communication interface for receiving image sensor data. The processing system also includes a central processing unit (CPU), in the form of one or more processors, for executing program instructions. The processing system typically includes an internal communication bus, program storage and data storage for various data files to be processed and/or communicated by the processing system, although the processing system often receives programming and data via network communications (not shown). Of course, the processing system functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of forming a three dimensional video recording of an imaging target, the method comprising:
    mounting an array of microlenses between the imaging target and an image sensor;
    determining, based on measured calibration parameters of the array of microlenses, a light field point spread function (PSF) characterizing a propagation of a wavefront from a point source collocated with the imaging target through the array of microlenses to the image sensor;
    computing, based on light scattering parameters of a light scattering medium of the imaging target, characteristics of light scattered in the imaging target and reaching the array of microlenses;
    determining, based on the light field PSF and the characteristics of light scattered in the imaging target, a scattering light field PSF characterizing a propagation of a wavefront from a point source located within the light scattering medium of the imaging target through the array of microlenses to the image sensor; and
    producing, using the determined scattering light field PSF, 3D volumetric information of the imaging target from a 2-dimensional (2D) recording of the imaging target.

2. The method of claim 1, wherein the producing of the 3D volumetric information of the imaging target further comprises:
    recording, using the image sensor, the 2-dimensional (2D) recording of the imaging target through an objective lens and the array of microlenses;
    determining, based on the determined scattering light field PSF, a transfer function characterizing a propagation of wavefronts from sample points throughout a sample volume of the imaging target through the light scattering medium of the imaging target and the microlens array to the image sensor; and
    performing on the recorded 2D recording of the imaging target, based on the determined transfer function, a light field 3-dimensional (3D) deconvolution to produce the 3D volumetric information of the imaging target from the recording.

3. The method of claim 2, wherein the recording comprises recording, using the image sensor, a 2-dimensional (2D) video recording of the imaging target, and
    wherein the producing the 3D volumetric information of the imaging target comprises producing 3D volumetric video information of the imaging target.

4. The method of claim 1, further comprising:
    determining, based on the medium of the imaging target, the light scattering parameters of a light scattering medium of the imaging target,
    wherein the light scattering parameters include a light scattering length, a light scattering anisotropy, and a light scattering depth.

5. The method of claim 1, wherein the computing characteristics of light scattered in the imaging target comprises:
selecting a plurality of sample points within an imaging volume; and
for each of the plurality of sample points, performing a Monte-Carlo simulation of light scattering of light rays emanating from the sample point.

6. A system for forming a three dimensional recording of an imaging target, the system comprising:
an image sensor for recording a 2-dimensional (2D) video of an image projected onto the image sensor;
an array of microlenses disposed between the imaging target and the image sensor,
wherein the array of microlenses is disposed in the light path of the camera sensor to project onto the image sensor an image of the imaging target; and
a processing system communicatively connected to the image sensor and configured to perform functions to:
determine, based on measured calibration parameters of the array of microlenses, a light field point spread function (PSF) characterizing a propagation of a wavefront from a point source collocated with the imaging target through the array of microlenses to the image sensor;
compute, based on light scattering parameters of a light scattering medium of the imaging target, characteristics of light scattered in the imaging target and reaching the array of microlenses;
determine, based on the light field PSF and the characteristics of light scattered in the imaging target, a scattering light field PSF characterizing a propagation of a wavefront from a point source located within the light scattering medium of the imaging target through the array of microlenses to the image sensor; and
produce, using the determined scattering light field PSF, 3D volumetric information of the imaging target from a 2-dimensional (2D) recording of the imaging target.

7. The system of claim 6, wherein the function to produce the 3D volumetric information of the imaging target comprises functions to:
record, using the image sensor, the 2-dimensional (2D) recording of the imaging target through a microscope objective lens and the array of microlenses;
determine, based on the determined scattering light field PSF, a transfer function characterizing a propagation of wavefronts from sample points throughout a sample volume of the imaging target through the light scattering medium of the imaging target and the microlens array to the image sensor; and
perform on the recorded 2D recording of the imaging target, based on the determined transfer function, a light field 3-dimensional (3D) deconvolution to produce the 3D volumetric information of the imaging target from the recording.

8. The system of claim 7, wherein the function to record comprises a function to record, using the image sensor, a 2-dimensional (2D) video recording of the imaging target, and
wherein the function to produce the 3D volumetric information of the imaging target comprises a function to produce 3D volumetric video information of the imaging target.

9. The system of claim 6, wherein the processing system is further configured to perform a function to:
determine, based on the medium of the imaging target, the light scattering parameters of a light scattering medium of the imaging target,
wherein the light scattering parameters include a light scattering length, a light scattering anisotropy, and a light scattering depth.

10. The system of claim 6, wherein the function to compute characteristics of light scattered in the imaging target comprises functions to:
select a plurality of sample points within a volume of the imaging target; and
for each of the plurality of sample points, perform a Monte-Carlo simulation of light scattering of light rays emanating from the sample point.

11. A method of forming a three dimensional recording of an imaging target, the method comprising:
recording, using a two-photon, multi-photon, or confocal excitation microscope, a three-dimensional image of the imaging target;
identifying, based on the recorded three-dimensional image recorded using the excitation microscope, cell body locations in the imaging target;
recording, using a light field microscope including an array of microlenses, a 2-dimensional (2D) recording of the imaging target;
performing on the 2D recording of the imaging target, a light field 3-dimensional (3D) deconvolution to produce 3D volumetric information of the imaging target from the recording; and
for each cell body location identified using the excitation microscope, extracting from the 3D volumetric information of the imaging target a time series signal representing activity at and around the identified cell body location.

12. The method of claim 11, wherein the extracting of the time series signal for each respective cell body location comprises:
computing a weighted sum of the 3D volumetric information at and around the respective cell body location at each of a plurality of time points of the time series signal,
wherein coefficients of the weighted sum are selected from a 3D Gaussian spatial filter.

13. The method of claim 11, wherein the extracting of the time series signal further comprises:
determining a spatial shift in a position of the imaging target; and
for each respective cell body location, computing a weighted sum of the 3D volumetric information at and around an adjusted location of the respective cell body at each of a plurality of time points of the time series signal,
wherein the adjusted location of the respective cell body is determined based on the spatial shift in the position of the imaging target.

14. The method of claim 13, wherein the spatial shift in the position of the imaging target is performed using at least one of non-negative matrix factorization and Bayesian MAP estimation.

15. The method of claim 11, further comprising:
performing temporal de-convolution of the extracted time series signal based on a model of the time dynamics of neuronal activity.

16. A system for forming a three dimensional recording of an imaging target, the system comprising:

a two-photon, multi-photon, or confocal excitation microscope configured to record three-dimensional images of the imaging target;

a light field microscope including an array of microlenses and configured to record 2-dimensional (2D) recordings of the same imaging target; and a processing system communicatively connected to the two-photo excitation microscope and to the light field microscope, and configured to perform functions to:

record, using the excitation microscope, a three-dimensional image of the imaging target;

identify, based on the recorded three-dimensional image recorded using the excitation microscope, cell body locations in the imaging target;

record, using the light field microscope, a 2-dimensional (2D) recording of the imaging target;

perform on the 2D recording of the imaging target, a light field 3-dimensional (3D) deconvolution to produce 3D volumetric information of the imaging target from the recording; and for each cell body location identified using the excitation microscope, extract from the 3D volumetric information of the imaging target a time series signal representing activity at and around the identified cell body location.

17. The system of claim 16, wherein the function to extract the time series signal for each respective cell body location comprises a function to:

compute a weighted sum of the 3D volumetric information at and around the respective cell body location at each of a plurality of time points of the time series signal, wherein coefficients of the weighted sum are selected from a 3D Gaussian spatial filter.

18. The system of claim 16, wherein the function to extract the time series signal further comprises functions to:

determine a spatial shift in a position of the imaging target; and for each respective cell body location, compute a weighted sum of the 3D volumetric information at and around an adjusted location of the respective cell body at each of a plurality of time points of the time series signal, wherein the adjusted location of the respective cell body is determined based on the spatial shift in the position of the imaging target.

19. The system of claim 18, wherein the spatial shift in the position of the imaging target is performed using at least one of non-negative matrix factorization and Bayesian MAP estimation.

20. The system of claim 16, wherein the processing system is further configured to perform a function to:

perform temporal de-convolution of the extracted time series signal based on a model of the time dynamics of neuronal activity.

* * * * *